US008321806B2

(12) United States Patent
Agrusa et al.

(10) Patent No.: US 8,321,806 B2
(45) Date of Patent: Nov. 27, 2012

(54) VISUALIZATION OF PROCESS CONTROL DATA

(75) Inventors: Russell L. Agrusa, Westwood, MA (US); Simone Massaro, Mansfield, MA (US); Leonardo Altamore, Foxborough, MA (US); Vojta Kresl, Plzen (CZ); Roberto Vercelli, Genoa (IT); Alexander Klimov, Sharon, MA (US); Roberto Raimondo, Ceriale (IT); Christopher N. Elsbree, Milford, MA (US)

(73) Assignee: Iconics, Inc., Foxborough, MA (US)

( * ) Notice: Subject to any disclaimer, the term of this patent is extended or adjusted under 35 U.S.C. 154(b) by 822 days.

(21) Appl. No.: 12/249,349

(22) Filed: Oct. 10, 2008

(65) Prior Publication Data
US 2009/0210814 A1 Aug. 20, 2009

Related U.S. Application Data

(63) Continuation of application No. PCT/US2008/078434, filed on Oct. 1, 2008.

(60) Provisional application No. 60/976,580, filed on Oct. 1, 2007.

(51) Int. Cl.
*G06F 3/048* (2006.01)
*G05B 11/01* (2006.01)

(52) U.S. Cl. .................. 715/772; 715/859; 700/17
(58) Field of Classification Search .................. 700/17, 700/83, 180; 715/736, 859, 772
See application file for complete search history.

(56) References Cited

U.S. PATENT DOCUMENTS

| 5,950,006 | A | 9/1999 | Crater et al. |
| 5,975,737 | A | 11/1999 | Crater et al. |
| 6,201,996 | B1 | 3/2001 | Crater et al. |
| 6,965,855 | B1 | 11/2005 | Burbridge et al. |
| 7,003,558 | B2 | 2/2006 | Agrusa et al. |
| 7,162,534 | B2 | 1/2007 | Schleiss et al. |
| 7,567,844 | B2 * | 7/2009 | Thomas et al. ............... 700/19 |
| 2002/0138582 | A1 | 9/2002 | Chandra et al. |
| 2007/0038963 | A1 * | 2/2007 | Moore ..................... 715/859 |
| 2007/0052702 | A1 | 3/2007 | Trotta et al. |
| 2007/0148658 | A1 | 6/2007 | Nelson et al. |
| 2009/0112664 | A1 | 4/2009 | Sprogis et al. |
| 2009/0210071 | A1 | 8/2009 | Agrusa et al. |

OTHER PUBLICATIONS

International Search Report and Written Opinion for PCT Application No. PCT/US08/78434, mailing date Jan. 12, 2009 (8 pages).

* cited by examiner

*Primary Examiner* — Haoshian Shih
(74) *Attorney, Agent, or Firm* — Goodwin Procter LLP

(57) ABSTRACT

Graphical representations of operational process control data associated with monitored processes is displayed within the context of the geographical locations at which the processes operate, and in a manner as to model individual components of the processes.

26 Claims, 22 Drawing Sheets

VISUALIZATION OF PROCESS CONTROL DATA

CROSS-REFERENCE TO RELATED APPLICATIONS

This application is a continuation of and claims priority to Patent Cooperation Treaty Application Serial No. US2008/78434, filed on Oct. 1, 2008, which claims the benefit of provisional U.S. patent application Ser. No. 60/976,580, filed Oct. 1, 2007.

TECHNICAL FIELD

This invention relates to computer-based methods and systems for accessing and presenting data, and more specifically to systems and methods for gathering, analyzing, formatting and presenting information related to controlled and/or monitored processes and environments.

BACKGROUND

Process monitoring and control relates to the viewing and control of parameters of one or more processes, environments in which the processes are performed, and/or the operation of equipment executing the processes. In the manufacturing context, for example, process parameters can include duration, temperature, pressure, speed, quantity, and/or direction of motion of a particular piece of machinery. In other processes, such as in those performed in the course of using and maintaining information systems, management systems, and the like, the parameters can include to temperature of the operating environment, throughput (transactional and/or packet-based), downtime, usage, and similar quantities. Process control systems can be used to help manage production, monitor and maintain equipment, view performance and operational trends, and/or perform business functions such as remotely modifying operational parameters, visual inspections, and maintenance scheduling.

Recently, OPC Foundation, which oversees the development of the object-linking and embedding (OLE) for process control has adopted a Unified Architecture Specification that sets forth standard data formats and security and access protocols so that its members may build and implement systems that work together under a common framework. This standard goes only so far, however, in that it does not provide for easy to use and visually appealing representations of the data. Because complex processes and environments can be geographically dispersed across the globe and individual installations can have hundreds of individual processes and parameters that require monitoring, the raw data is only part of the solution.

SUMMARY OF THE INVENTION

The invention provides methods and computer-based systems for representing of processes, environments and machinery in a manner that facilitates effective monitoring and manipulation of various parameters, key process and/or performance indicators and overall efficiency. Data from disparate locations involving any number of individual pieces of equipment, logistical apparatuses (e.g., pipelines, transportation avenues, etc.), environmental controllers and monitors (e.g., thermostats, security cameras) and other devices is collected, transmitted and stored according to various data formats that support HMI (Human/Machine Interface) and SCADA (Supervisory Control and Data Acquisition) applications, as well as others. Embodiments of the invention further comprise modules providing data transportation and normalization, data visualization, language aliasing, expression calculation, script editing, charting as well as other functions across a common application framework.

In one aspect, the invention provides a system for monitoring operational process control (OPC) data and includes a human-machine interface and a configuration server. The interface facilitates the presentation of the OPC data and includes a geographic representation of an area of interest, graphical representations of monitored processes, and graphical status indicators associated with each monitored process. The graphical representations are displayed at a location within the geographic representation corresponding to a physical location of the monitored process, and the graphical status indicators associated with each monitored process are responsive (either in real-time or asynchronously) to data received from the monitored processes. The server facilitates the configuration of the graphical status indicators and their associations with the monitored processes. In certain cases, the received data may be formatted and/or transmitted according to various standards, such as object linking and embedding for process control standards, web services, and the like.

In some embodiments, the system may also include a data storage device for storing the configuration parameters that define the presentation of the graphical representation of the monitored process and the status indicators. In one embodiment, the geographic representation comprises data received from a geographic information system (GIS) such as Virtual Earth, as well as other systems that utilize asynchronous javascript and data provided using a markup language such as XML. In certain implementations, the interface accepts user-initiated commands directed to the status indicators that, when received, causes the display of the OPC data associated with the status indicators.

The monitored processes can, for example, be industrial processes, manufacturing processes, assembly processes, transportation processes, building automation processes and/or environmental processes. In some instances, visual properties of the status indicators (e.g., color, font, shape, visible text and/or the frequency of change of a property) change in response to the received data. In some cases, the data may be processed prior to directing the behavior of the status indicators by aggregating, filtering or otherwise manipulating the data, thereby defining one or more performance metrics which may, in turn, be used to influence the presentation of the status indicators. In some instances, thresholds may be defined that represent alarm conditions, and in such cases the status indicators may respond to the alarm conditions by changing one or more properties of the status indicators.

In certain embodiments, the status indicators may have multiple icon segments, each corresponding to one or more components or parameters of the monitored process, some of which may be stored at or generated by different sources. The arrangement of the icon segments may, in some cases, reflect a physical arrangement of the monitored process, a three-dimensional representation of the monitored process, a charted representation of process metrics over time, evoke a component of an OPC device, or some combination thereof. In implementations in which the representations of the monitored processes comprise three-dimensions, the graphical status indicators can remain associated with each monitored process notwithstanding changes to orientations of the three-dimensional renderings.

The icon segments can respond to the received data in real-time or asynchronously by, for example, changing certain visual properties of the icon segments in response to the received data. Such visual properties may include the color, font, shape, physical arrangement and visible text associated with the icon segment, and the changes be presented at any periodicity.

In another aspect, the invention provides a method of monitoring a process that includes receiving a plurality of data feeds and displaying graphical representations of the received data. The data feeds include operational process control data representative of components of the monitored process. The display includes a geographic representation of an area of interest, a graphical representation of the monitored process, and graphical status indicators. The graphical status indicators are associated with a component of the monitored process, and are displayed at locations within the geographic representation corresponding to physical locations at which the corresponding components of the monitored process operate, and are responsive to the operational process control data.

Various embodiments facilitate the provision (and in some cases storage) of configuration parameters that define the graphical representation of the monitored process, the status indicators and the associates among the status indicators and the components of the monitored process. Visual properties of the status indicators may change (asynchronously and/or in real-time) in response to changes in the OPC data, which may also be processed subsequent to receipt but prior to influencing the status indicators. In some cases, the configuration parameters may include thresholds that define when the visual properties of the status indicators change. User selection of a status indicator on the display can cause the presentation of the OPC data associated with the status indicator. In implementations in which the representations of the monitored processes comprise three-dimensions, the graphical status indicators can remain associated with each monitored process notwithstanding changes to orientations of the three-dimensional renderings.

In another aspect, the invention provides a method for configuring graphical status indicators associated with operational process control data. Steps of the method include associating graphical status indicators with respective sources of operational process control data representative of operations at corresponding components of a monitored process and with geographical locations at which the components of the monitored process occur. The method also includes associating individual segments of the graphical status indicators with the corresponding components of the monitored process and arranging the visual representation of the individual segments as to evoke the components of an operational process control device. The parameters describing the various associations and arrangements are then stored in a server for subsequent retrieval and use in displaying the graphical status indicators.

In another aspect, the invention comprises an article of manufacture having a computer-readable medium with the computer-readable instructions embodied thereon for performing the functions and implementing the systems described in the preceding paragraphs. In particular, the functionality of the present invention may be embedded on a computer-readable medium, such as, but not limited to, a floppy disk, a hard disk, an optical disk, a magnetic tape, a PROM, an EPROM, CD-ROM, or DVD-ROM. Such functionality may be embedded on the computer-readable medium in any number of computer-readable instructions, or languages such as, for example, FORTRAN, PASCAL, C, C++, Java, C#, Tcl, BASIC and assembly language. Further, the computer-readable instructions may, for example, be written in a script, macro, or functionally embedded in commercially available software (such as, e.g., EXCEL or VISUAL BASIC).

BRIEF DESCRIPTION OF THE DRAWINGS

Referring now to the drawings in which like reference numbers represent corresponding parts throughout and in which.

DETAILED DESCRIPTION

The invention relates generally to monitoring and controlling processes, which can include controlling equipment (such as valves and gauges) in an automated factory or process line, the operation of power plants, water treatment facilities, heating, air conditioning and ventilation ("HVAC") systems. Embodiments of the invention can be used in activities that involve the interactions of humans with control processes and systems, for example, in nursing homes, in amusement park rides, and even in prisons. Embodiments of the invention can also be used to monitor and manage operations in a discrete manufacturing environment, where data or events result in the generation and use of digital signals.

Architecture and Basic Components

Figure 1:
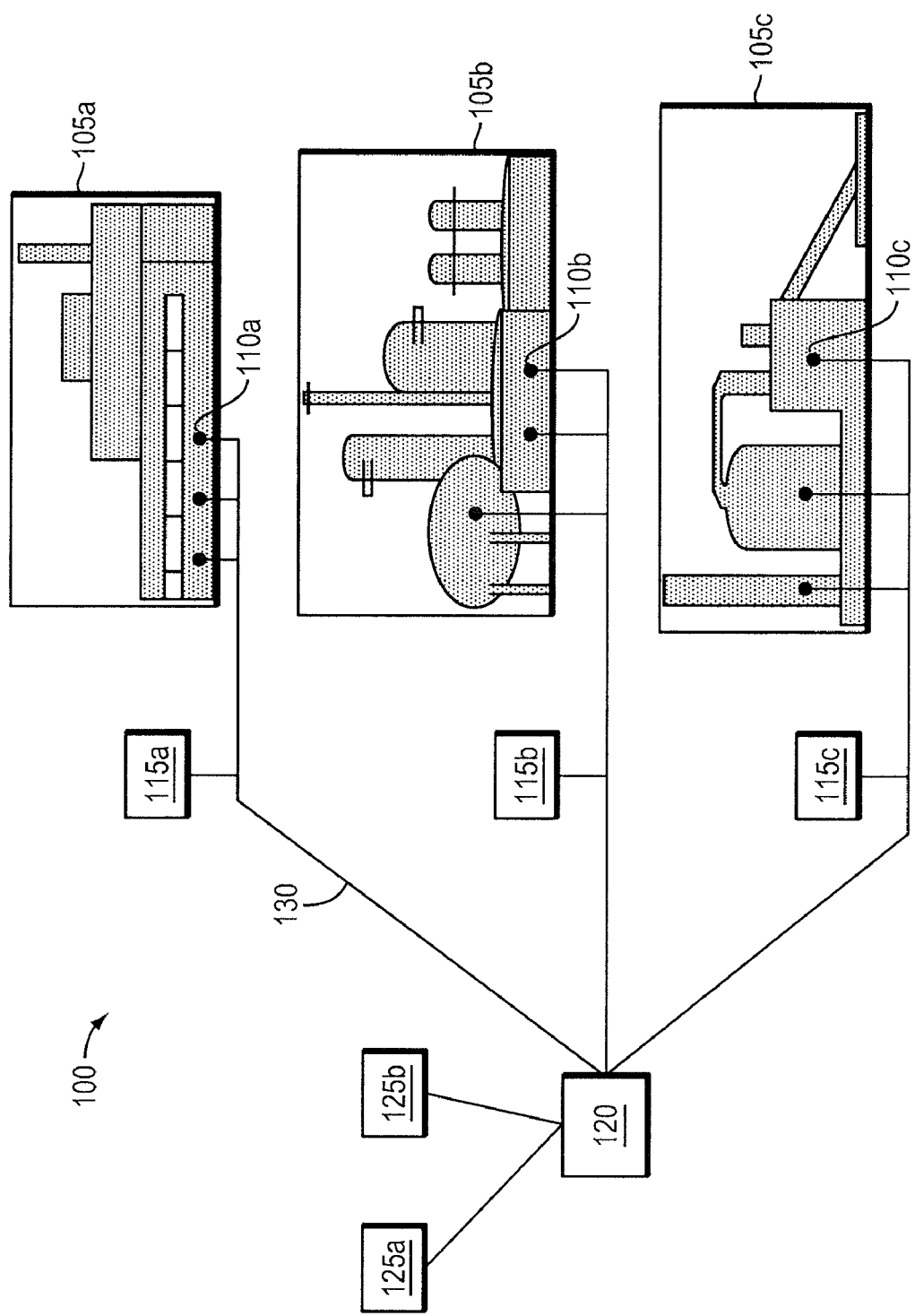
FIG. 1 is a illustration of the general environment in which various embodiments of the invention operates.

FIG. 1 depicts, generally, an exemplary environment 100 in which various embodiments of the present invention operates in order to collect, analyze, present, and act on operational process control (OPC) data as it is generated and collected. The OPC data is generated and collected at or more facilities 105a, 105b and 105c (generally, 105). In this example, three facilities 105 are shown for illustrative purposes only, as there may be any number of facilities 105, which may be part of a common processing or manufacturing facility, or geographically dispersed around the globe performing vastly different operations. To monitor individual processes and controls at each facility 105, process control equipment 110a, 110b and 110c may be installed to measure one or more processing parameters associated with the processes. For example, a gauge may be placed inside a boiler to measure the temperature and/or pressure, or an optical scanner placed at the end of a manufacturing step to measure throughput or look for defects. In any case, the data from the individual pieces of process control equipment 110 can be collected for the entire facility and reported at a facility-specific OPC server 115a, 115b, and 115c for reporting and control purposes. The data collection and reporting may take place in real-time, asynchronously, or in some cases a combination of both.

In larger implementations, a centralized data collection and reporting system may be used to consolidate, aggregate and/or compare data collected from each facility 105 and the various processes 110 operating at each facility 105. In such cases, an enterprise OPC server 120 may communicate with the facility-specific OPC servers 115, the individual controllers 110 continuously or periodically using one or more data communications services. The enterprise OPC server 120 may in turn support client workstations 125a and 125b at which the OPC data is presented to users.

Both the facility-specific and enterprise OPC servers 115, 120 (collectively, the "OPC servers") are preferably implemented on one or more server-class computers that have sufficient memory, data storage, and processing power and that run a server class operating system (e.g. SUN Solaris, GNU/Linux, MICROSOFT WINDOWS NT). Other types of system hardware and software may also be used, depending on the capacity of the device and the number and location of the facilities and/or processes being monitored. For example, the OPC servers may be part of a server farm or server network, which is a logical group of one or more servers. As another example, there may be multiple servers associated with or connected to each other, or multiple servers may operate independently, but with shared data. In a further embodiment and as is typical in large-scale systems, application software for collecting, aggregating and reporting the OPC data may be implemented in components, with different components running on different server computers, on the same server, or some combination. In yet other implementations, the functionality attributed to the servers may be implemented using so-called "cloud computing" wherein the data processing functions are shared among numerous computers connected via the Internet as a service.

Some or all of the components described above may be connected by and communicate via a network 130. The communication may take place via any media such as standard telephone lines, LAN or WAN links (e.g., T1, T3, 56 kb, X.25), broadband connections (ISDN, Frame Relay, ATM), wireless links, and so on. Preferably, the network 130 can carry TCP/IP protocol communications, and HTTP/HTTPS requests made by a web browser and the connections among the controllers 110, the facility-specific OPC servers 115, the enterprise OPC server 120 and the client workstations 125 can be communicated over such TCP/IP networks. The type of network is not a limitation, however, and any suitable network may be used. Typical examples of networks that can serve as the communications network 130 include a wireless or wired Ethernet-based intranet, a local or wide-area network (LAN or WAN), and/or the global communications network known as the Internet, which may accommodate many different communications media and protocols.

The clients 125 are preferably implemented as software running on a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C. (and others). The client 125 may also be implemented on such hardware as a smart or dumb terminal, network computer, wireless device, information appliance, workstation, minicomputer, mainframe computer, or other computing device, that is operated as a general purpose computer or a special purpose hardware device solely used for serving as a client 125 for viewing OPC data.

Figure 2:
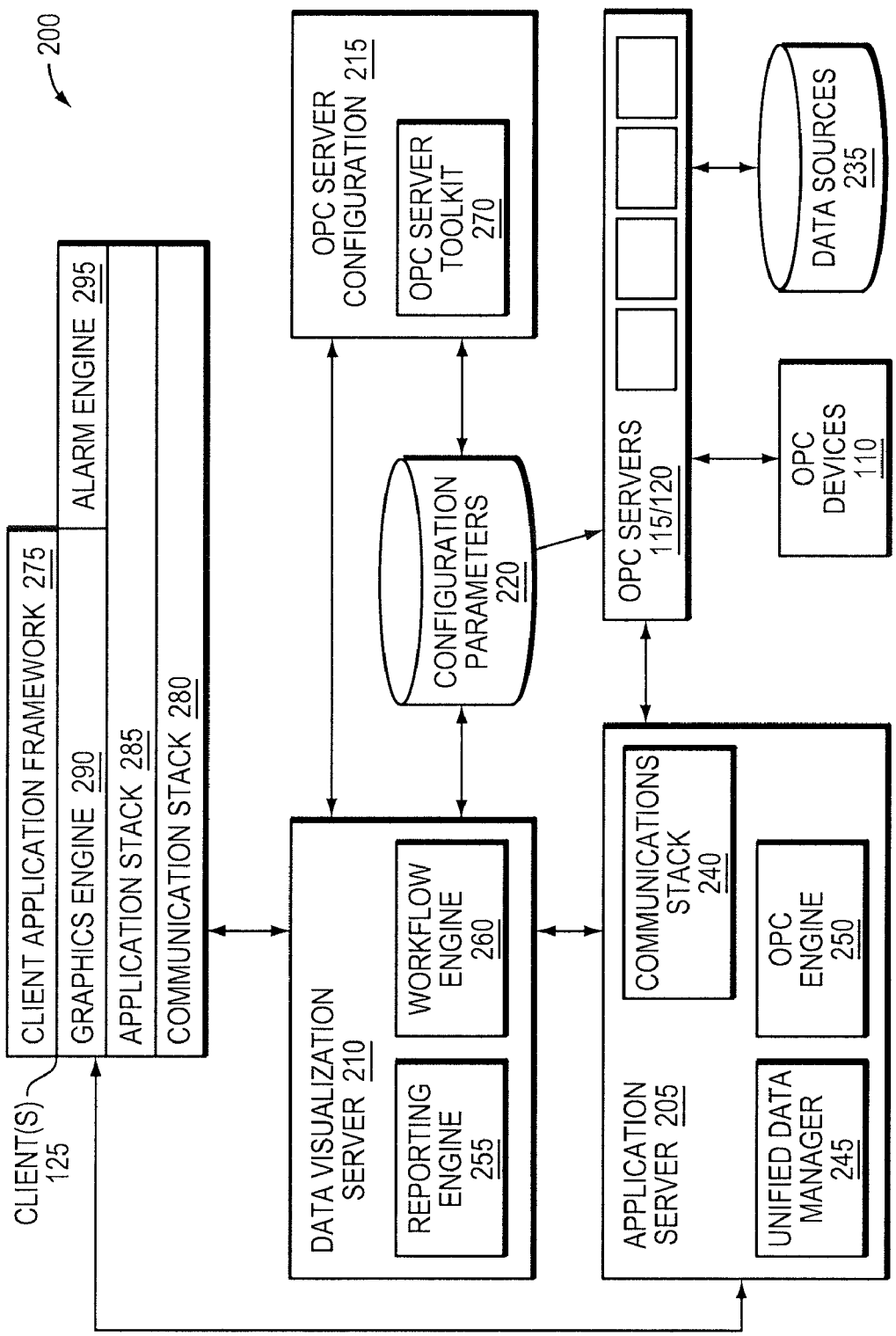
FIG. 2 is a block diagram of an application framework for implementing various embodiments of the invention.

FIG. 2 illustrates an exemplary component-based architecture 200 that includes both server-side and client-side components that may be used to implement various embodiments of the invention. In certain implementations, for example, various components take advantage of 64-bit computing to provide high scalability within operating platforms such as Windows Vista and Windows Server 2008 and utilize thin-client architecture such that the components can be executed over the web to provide maximum accessibility. In such instances, the components are developed according to one or more programming standards (e.g., .Net, java, etc.).

Generally, a system for collecting and reporting OPC data 200 includes an application server 205, a data visualization server 210, and a server-configuration user interface 215 that each operate in concert with one or more OPC servers. The system 200 may also include a data storage device 220 for storing configuration parameters that define the OPC servers. The application server 205 provides the primary data collection, aggregation and transformation processing for the system. For example, the application server 205 includes a communication stack 240 that allows the application server 205 to request and/or receive data from individual OPC servers 115, send data to the data visualization server 210 for charting and reporting, and the client workstations 125. The communications stack 240 includes a series of layered protocols for packaging and transmitting data among computers over a network. In most implementations, the communications stack provides TCP/IP-based communications among the system components to allow data to be sent via HTTP requests, XML/Web Services, and similar methods.

The application server also includes a unified data manager component 245 for manipulating data received from the various OPC servers 115. In many implementations, data is collected from processes and facilities with little or no defined relationship among the data elements. For example, a shift supervisor may enter comments into an electronic log, and the comments receive timestamps and an operator ID. At the same time, OPC devices may be collecting processing data such as throughput (e.g., pieces/hour) and quality measurements (e.g., defects/100 pieces), all of which are measured using different units (if any) and relating to different aspects of the facility. The unified data manager component 245 analyzes the incoming data and applies a rules-based algorithm to allow the data to be reported and charted using common units.

In some embodiments, the application server 205 also includes an OPC engine 250 for analyzing the OPC data as it is collected (either in real-time or asynchronously) and determining what subsequent processing, events and/or alarms are appropriate. For example, a set of rules may be defined such that the certain events (e.g., non-receipt of data, a data value outside a preferred range, etc.) warrant an alarm to be triggered and sent to a client workstation 125. In some instances the OPC engine 250 formats the data for presentation on reports and charts, or may annotate the data with one or more workflow components, described in greater detail below.

The primary function of the data visualization server 210 is to receive data from the application server and present it in raw tabular form, text-based reports, graphical reports, and representations of the monitored processes enhanced with additional data (e.g., supply-chain data, inventory data, financial data, etc.), alarms, and visual indicators relating to the processes. A reporting engine 255 utilizes pre-defined report formats but also includes graphical tool-kits that facilitate the design of custom graphs based on user and/or process-specific requirements. In some implementations, OPC data is annotated with workflow information, such as a distribution list identifying recipients (e.g., individuals, workstations, or other systems) to which the data is to be sent. In some instances, the OPC data may be available in raw format according to one or more OPC standards using commonly-used data publishing techniques such as web services. In other cases, reports and/or data may be sent in-preformatted reports or as a stream of data used by a client application. In such cases, a workflow engine 260 manages the distribution of data and/or reports according to workflow rules associated therewith.

Figure 3:
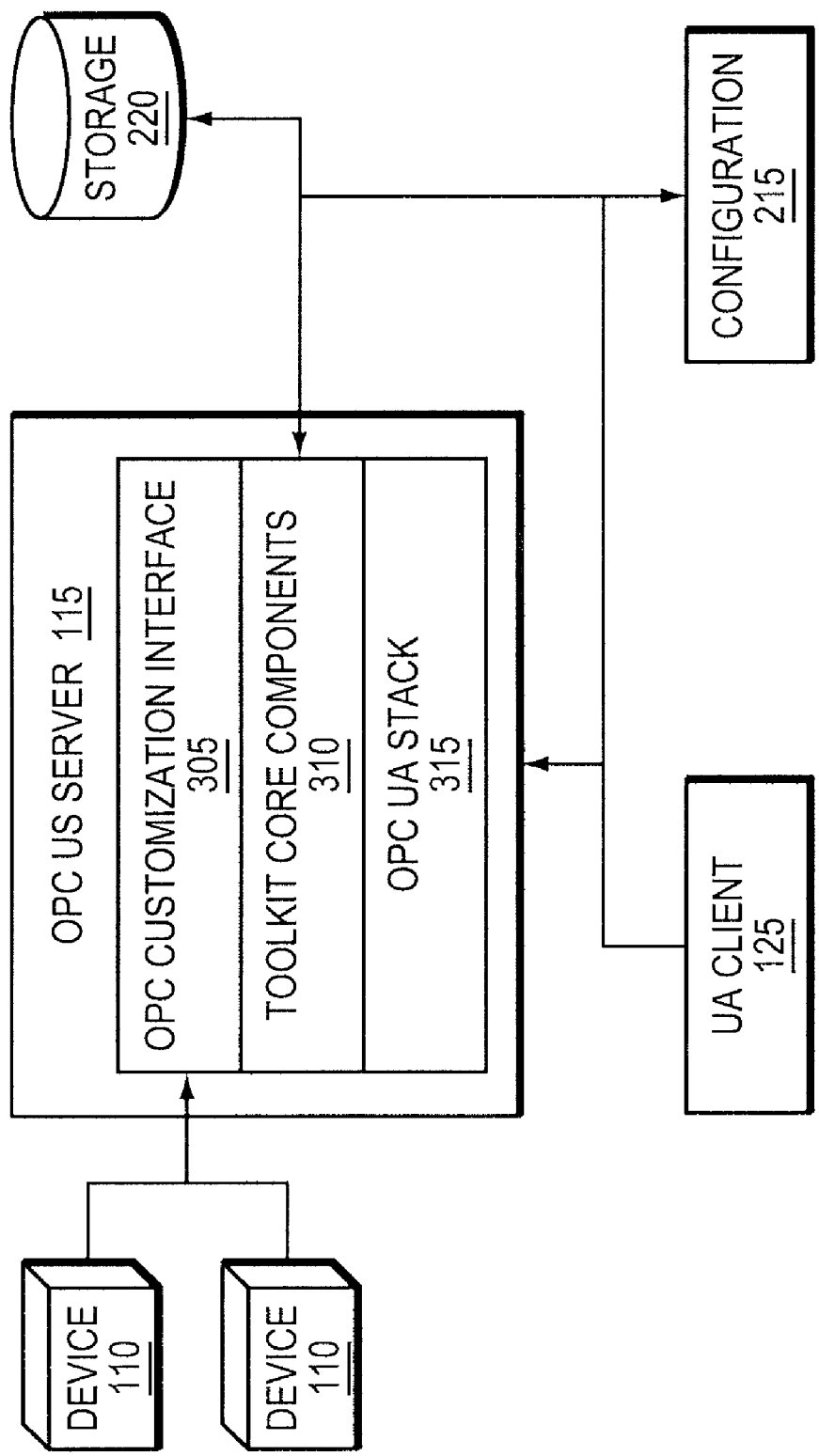
FIG. 3 is a more detailed block diagram of the OPC server of FIG. 2 according to one embodiment of the invention.
Figure 4:
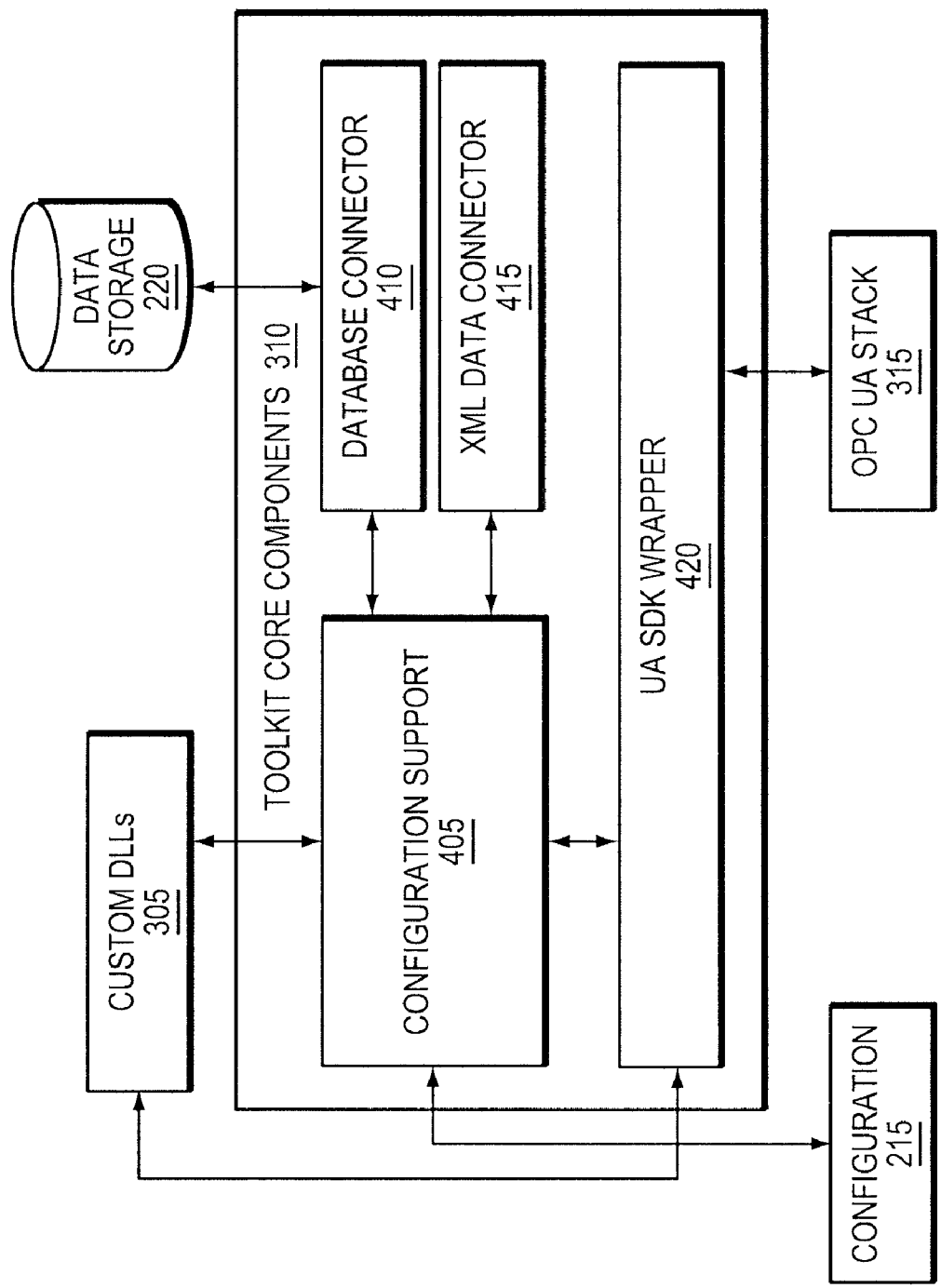
FIG. 4 is a more detailed block diagram of the OPC server toolkit of FIG. 3 according to one embodiment of the invention.

The server-configuration user interface 215 facilitates the creation and configuration of one more OPC-compliant unified architecture (OPC UA) servers (115 and/or 120) through the use of an OPC server toolkit 270. FIG. 3 illustrates, generally, the structure of an OPC UA server generated by the toolkit 270, including an OPC customization interface 305 for facilitating the definition of device-specific logic independent of the communication layer used to address the device, core toolkit components 310 and the OPC UA stack 315, which provides the data transport layer for the OPCT data. In some embodiments, the OPC server also includes installation wizards for graphically guiding users through the process of configuration and deployment of the OPC server and one or more pre-configured example servers. FIG. 4 illustrates the primary toolkit components 310. A configuration support component 405 facilitates the construction of type definitions and address space(s) needed for storing the configuration parameters that define the OPC servers. Database connectors 410 provide connectivity to one or more external databases and support both scheduled and on-demand loading of data into the OPC server. An XML data connector 415 facilitates the importing and structuring of data in markup language formats. A UA standard development kit wrapper 420 isolates the user from the UA development environment by providing a set of defined overrides that alter definitions of the configuration data without having to modify the underlying code base.

The OPC UA toolkit 270 facilitates the definition of complex objects and logic within the OPC Server. The complex objects may then be mapped to physical devices (pumps, machinery, etc.) to create in-memory representations of the devices being monitored. For example, the creation of the complex objects can be done programmatically using an API similar to the one shown below:

```
ObjectDefinition myPump = new ObjectDefinition( );
myPump.AddVariable("flow", StandardVariables.AnalogItem);
myPump.AddVariable("pressure", StandardVariables.AnalogItem);
TypeDefinitions.Add(myPump);
```

In other embodiments, complex objects can also be created interactively through the configuration user interface 215 using dialog boxes and hierarchical parameter definitions.

OPC server toolkit 270 includes as set of "wizards" that guide users through the process of creating the OPC UA servers, including all necessary and optional OPC UA server components. The toolkit 270 also includes sample projects, such as a Modbus Serial OPC UA Server and a Modbus Ethernet OPC UA Server, redistributable modules that can be used across multiple servers such as a OPC UA stack and tracing and debugging modules, and documentation.

Figure 5:
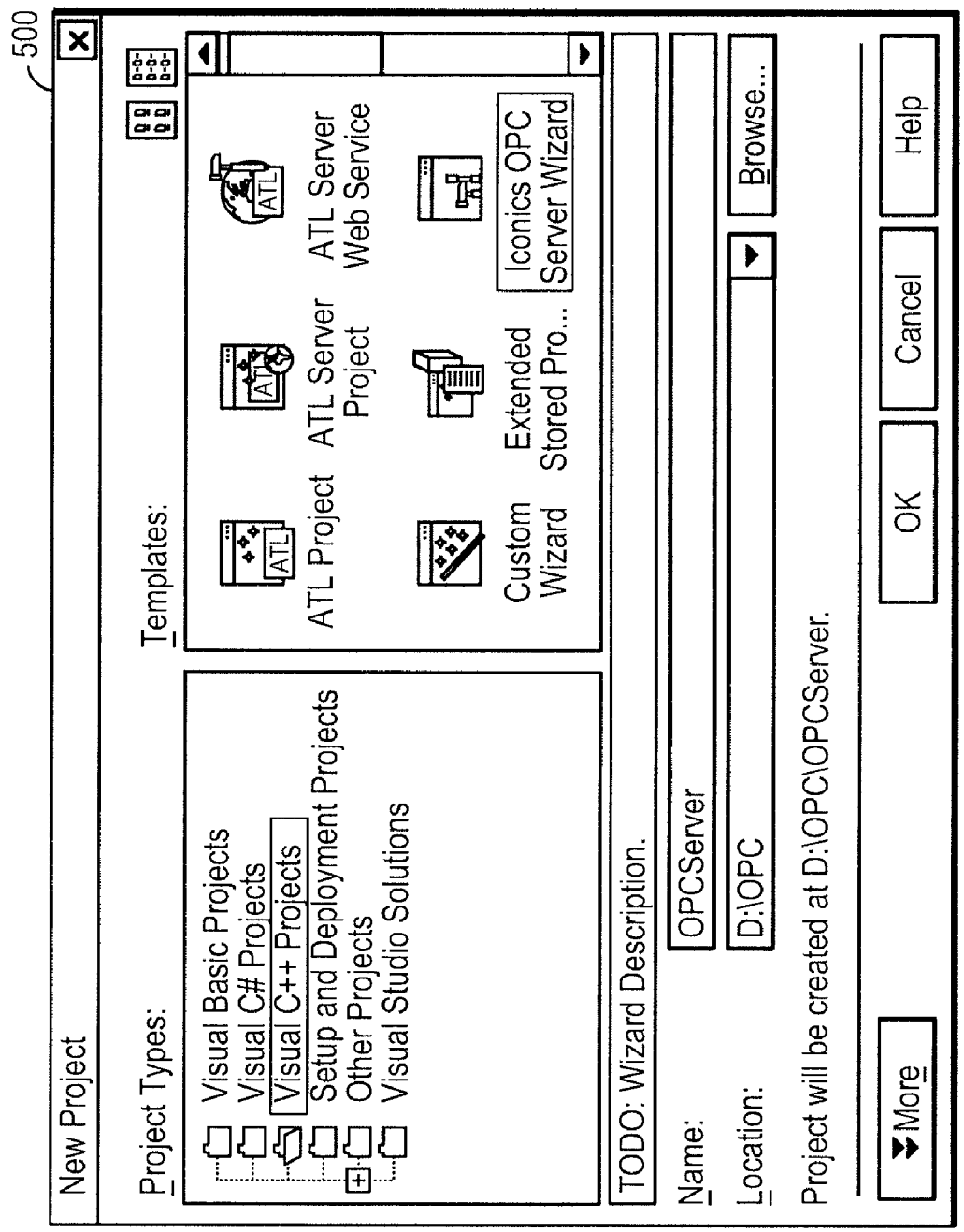
FIG. 5 is an illustrative screen capture from an OPC server configuration wizard according to one embodiment of the invention.
Figure 6:
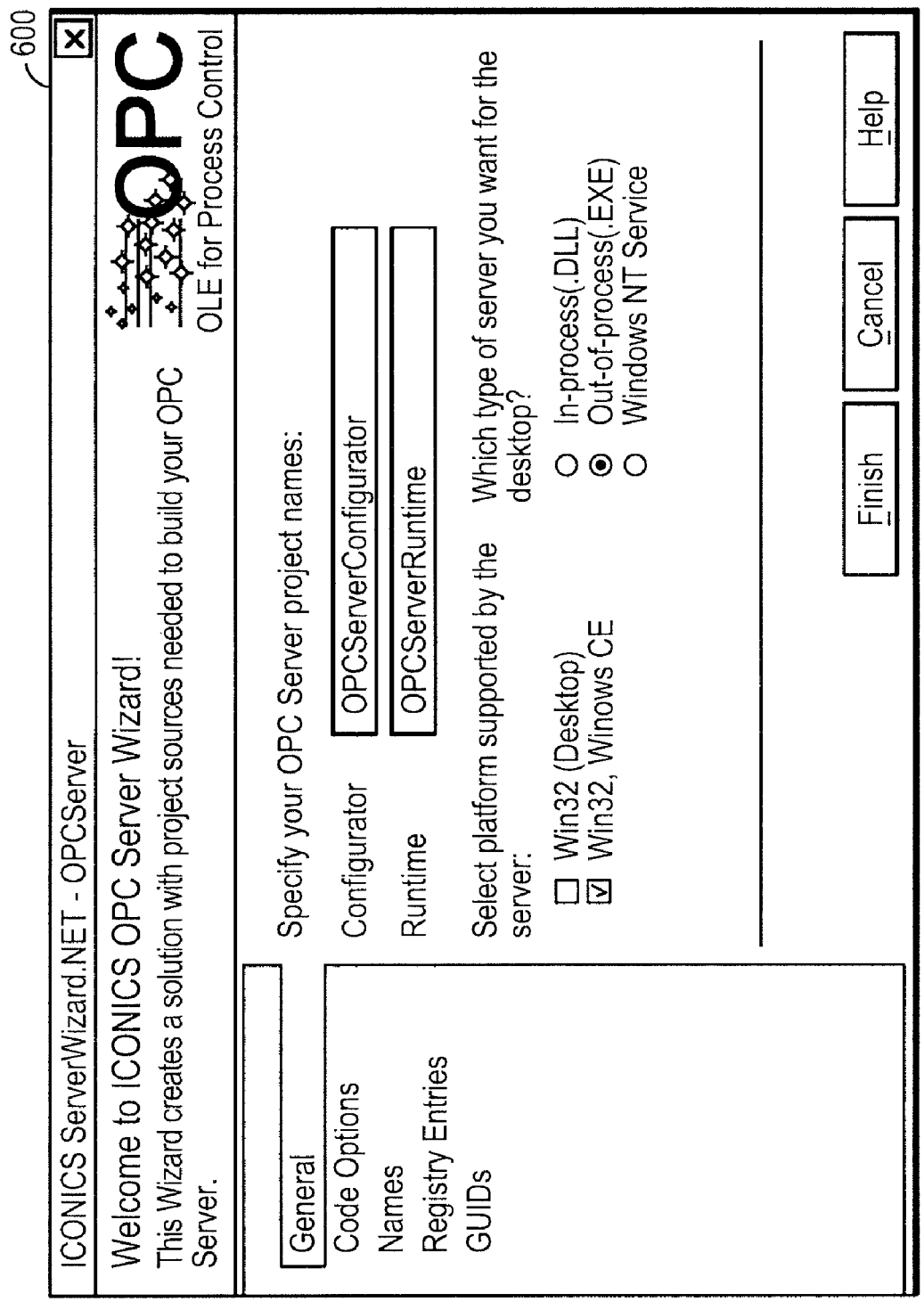
FIG. 6 is a second illustrative screen capture from an OPC server configuration wizard according to one embodiment of the invention.
Figure 7:
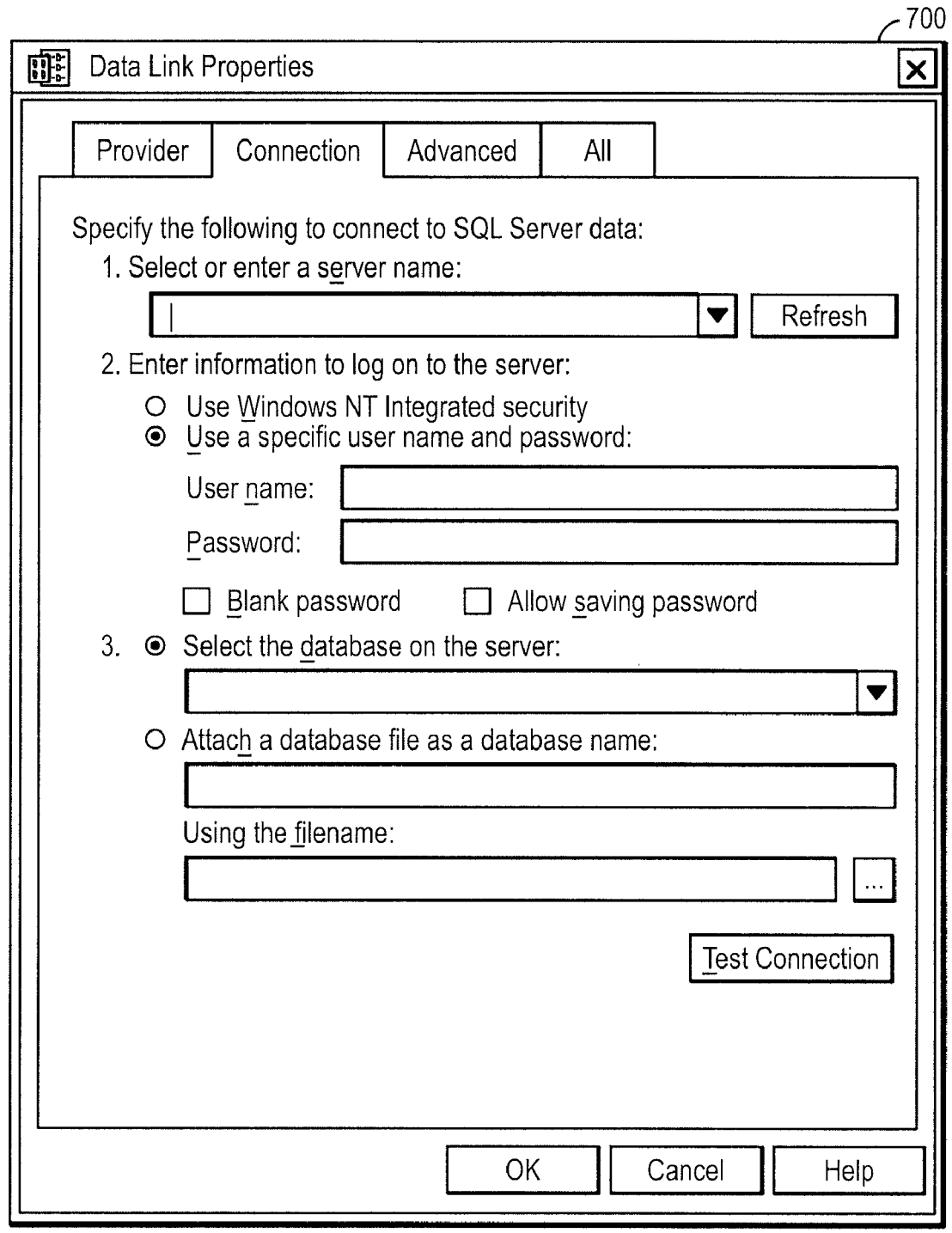
FIG. 7 is a third illustrative screen capture from an OPC server configuration wizard according to one embodiment of the invention.

In one embodiment, and with reference to FIGS. 5-7, creating an OPC-compliant server includes the following steps. The OPC UA Toolkit Wizard 500 (which in one implementation may be integrated into a programming and development environment such as Microsoft's Visual Studio 2005) is initiated and the user navigates through screens 600 and 700 that contain references and options relating to the configuration parameters defining the OPC UA Server. The following projects are created: data layer, business entities, forms, web service, workbench provider and OPC UA Runtime. The wizard 500 also creates a template configuration database. This database is constructed based on the OPC UA server's architecture, which specifies the necessary tables and columns. Defined relationships and connections are established to the database from the web service project and a connection string is created and stored in a web server configuration file. Stored procedures may then be created for the database tables, thus creating the SQL Server script file (*.sql), which can then be applied to the configuration database to import the stored procedures. Individual business entities objects are created representing each of the monitored processes and or devices. Data layer objects are created based on the defined business entities, from which C# methods are built that wrap the stored procedures. A Windows Communication Foundation Service is then created and this wraps the data layer. Once the objects, methods and data layer are defined, forms can be created for each defined business entity object, allowing users to enter relevant information regarding the object once the mappings between the business entity objects and corresponding forms are defined. Once complete, the OPC runtime server 115 may be started.

Any suitable relational database management system (e.g., Microsoft SQL Server 2008, My SQL, Oracle, etc.) may be used to store the configuration parameters of the OPC UA server. The configuration parameters may also be stored in a more generic form, such as XML.

Graphical Representation of OPC Data

Figure 8:
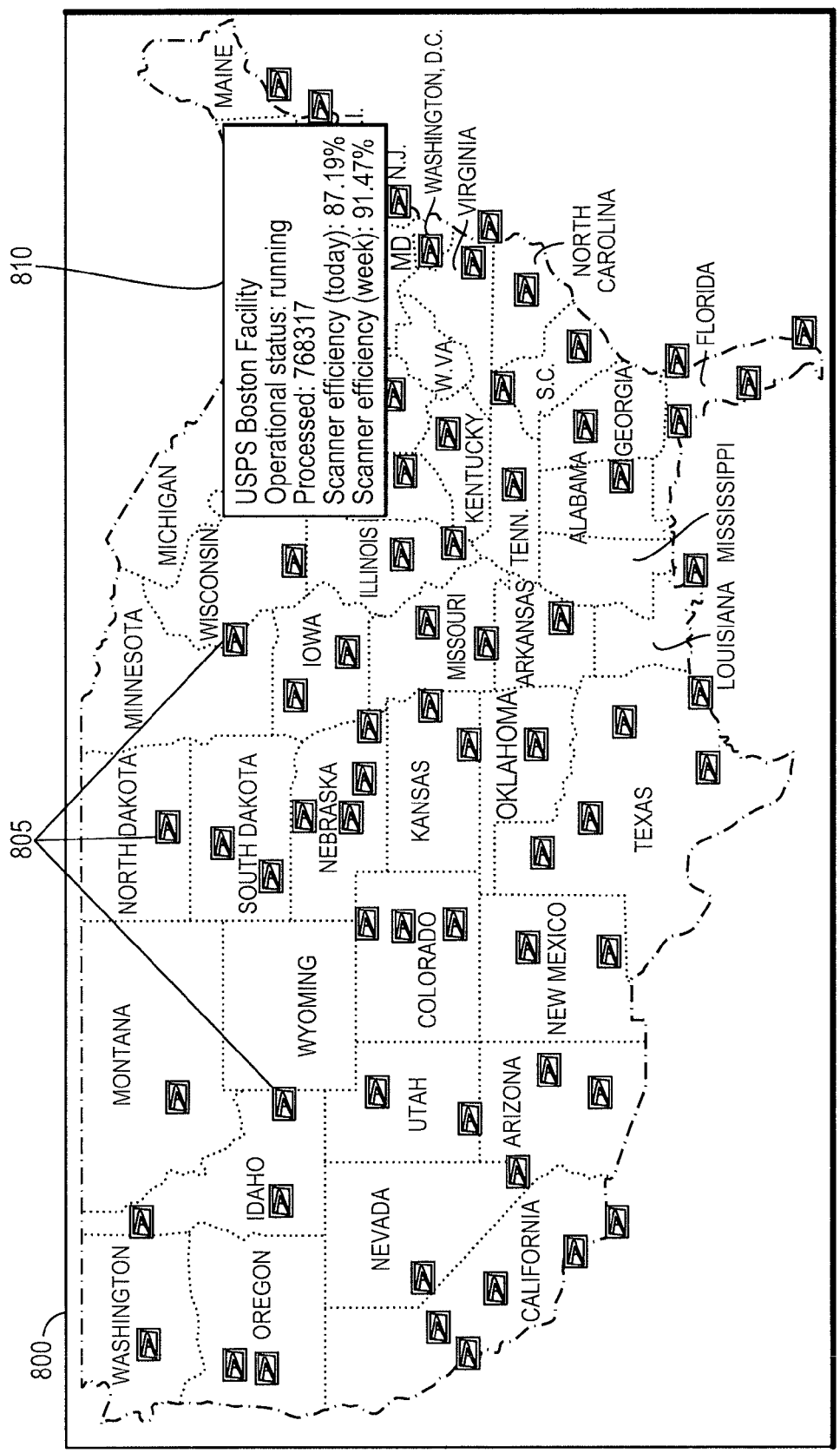
FIG. 8 is an example of the application of OPC data in conjunction with a GIS application according to one embodiment of the invention.
Figure 9:
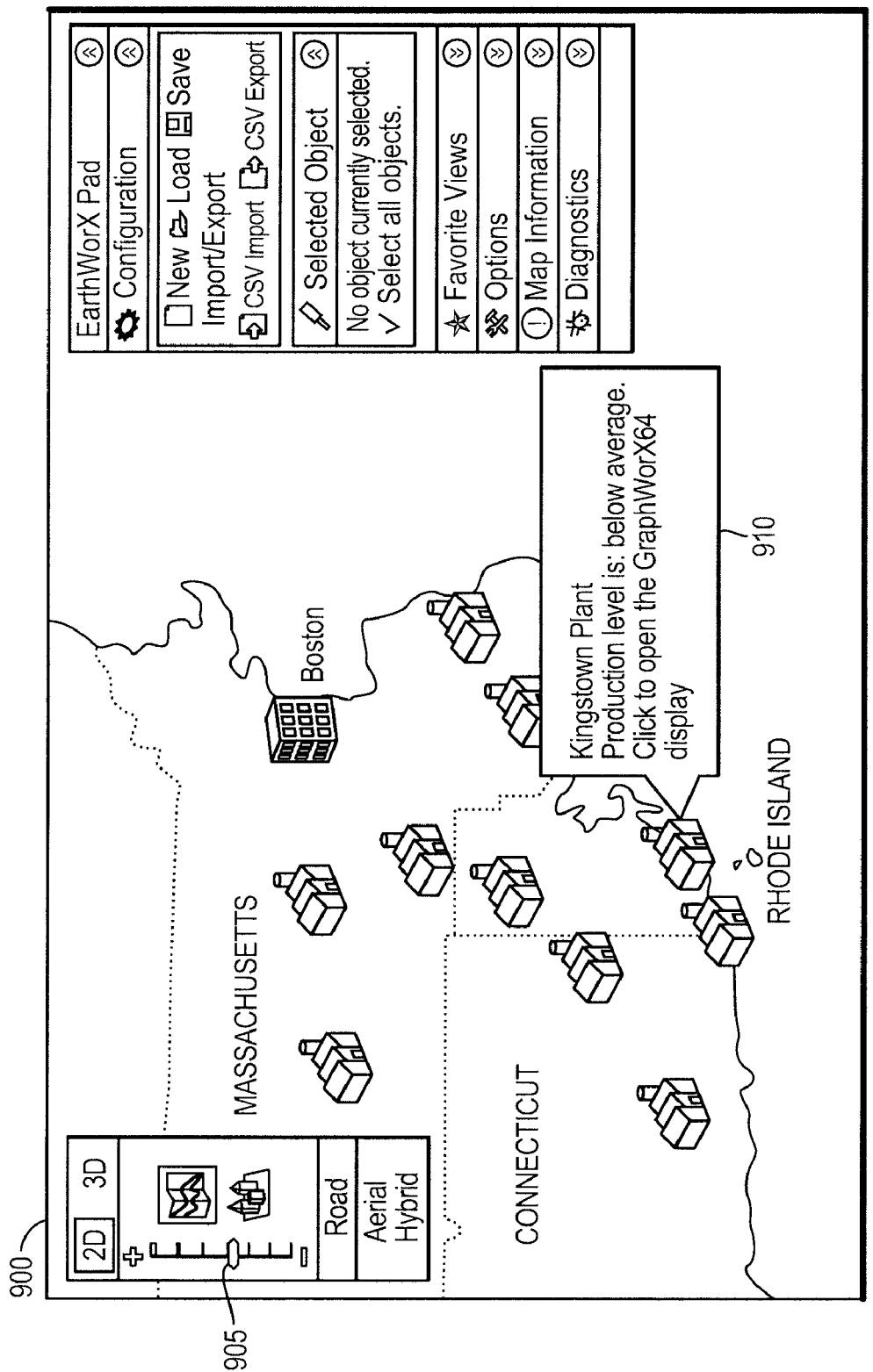
FIG. 9 is a more detailed example of the application of OPC data in conjunction with a GIS application according to one embodiment of the invention.

Referring to FIGS. 8 and 9, and using the architecture described above, process control, HMI, and/or SCADA data can be visually displayed in real-time within a geographic context by integrating GIS data with the OPC data as monitored by the OPC servers. In this manner, the application of conventional GIS applications may be extended to the process monitoring and control realm. GIS applications feature interactive maps similar to maps 800 and 900 that may be used to represent a monitored facility or process at a geographic location 805 at varying degrees of granularity—from the entire world to a country, a city block or a section of a warehouse. Users an interactive navigation tool 905, users navigate the whole map, zoom in or out, or limit the viewing area to those sections where data is available.

According to various embodiments of the invention, data collected from process control and monitoring devices and applications is associated with locations 805 on the map 800, thereby allowing users to view, evaluate, analyze and in some cases act on OPC data 810, 910 within a geographic context. In these examples, process information can be represented on the map as a "pin." A pin can graphically represent one or more data elements (process indicators, efficiency metrics, operational states, etc.) and be linked to a specific geographic location. For example, key process indicators (e.g., process throughput) may be received from different plants, each with a pin placed on the map according to its actual physical location. By associating the received data with the pin (either generally, or with a particular property of the pin), the visual representation of the pin cab be varied to reflect the current state of the process.

In some implementations, process control data may represent an area of the map rather than a single location. In such cases, a two-dimensional shape (e.g., a polygon) may be used instead of a single pin to identify the specific location, and data sources assigned to one or more attributes of the polygon (e.g., shape, size, color, etc.) as with the pins. For path-based processes (e.g., transportation routes, pipelines, etc.) a sequence of connected lines (a "polyline") may be used.

In the manufacturing context, factories, processing centers, distribution centers, and other facilities may be located anywhere in the world and connected by any number of transportation routes. A pin may be defined for each facility 805 and located at a point on the map 800 corresponding to its physical location and associated with a data source from the corresponding facility (or, in some cases, an intermediate data center). The interactive nature of the map allows users to define the pins "on the map" and use a pointer device such as a mouse to place them at the correct location. Alternatively, coordinate data (e.g., an address or longitude/latitude coordinates) may be provided to fix the pin to a location on the map 800. The data may represent a single value (e.g., a binary yes/no condition or a discrete value such as processing rate), a combination of values, or a metric calculated from the data. If a key metric reaches a predetermined alarm value, a property of the icon may change to reflect the condition—a green flag may turn red or start blinking at some periodicity, for example. The user may "zoom in" on a particular facility to see additional details about processes or conditions at that facility. In certain cases, pins may be defined such that certain pins are hidden when the map is viewed at a certain scale, and appear as the user zooms in on a particular area. Icons representing individual pieces of machinery may then be presented to a user the map is scaled down to an appropriate level.

Another example implementation is a fault monitoring system of a large industrial complex (such as a refinery), where teams of individuals provide monitoring and technical services throughout the complex. The complex may be split up into several smaller areas, each assigned to a team. By defining a polygon on the GIS map for each area, a user can see graphically the number, type and extent of the faults or processing conditions detected in each area and assess the current allocation of resources accordingly.

The invention allows for interaction with other framework components such as two- and three-dimensional Human-Machine Interface (HMI)/Supervisory Control And Data Acquisition (SCADA) systems through a series of actions that are triggered by screen, keyboard and/or mouse events, such as when a user clicks on an object on the map to load an HMI/SCADA display, open a web page, show tooltips, perform data reads and/or writes, activate alarms or launch external applications.

Smart Pins

As noted above, pins may be expanded to include multiple visual indicators of process and/or monitoring data and placed on the map or HMI/SCADA display. In one implementation, a set of shapes or segments (e.g., small squares or rectangles) represent each visual value, and the collection of the segments represents the overall process, environment or machine. For example, a piece of machinery may have nine process metrics associated with it, such as operating temperature, vibration, throughput, power consumption, maintenance status, etc. A data source for each metric may be assigned to a corresponding segment, and the segment is periodically updated to reflect the changing status of the corresponding metric.

Figure 10B:
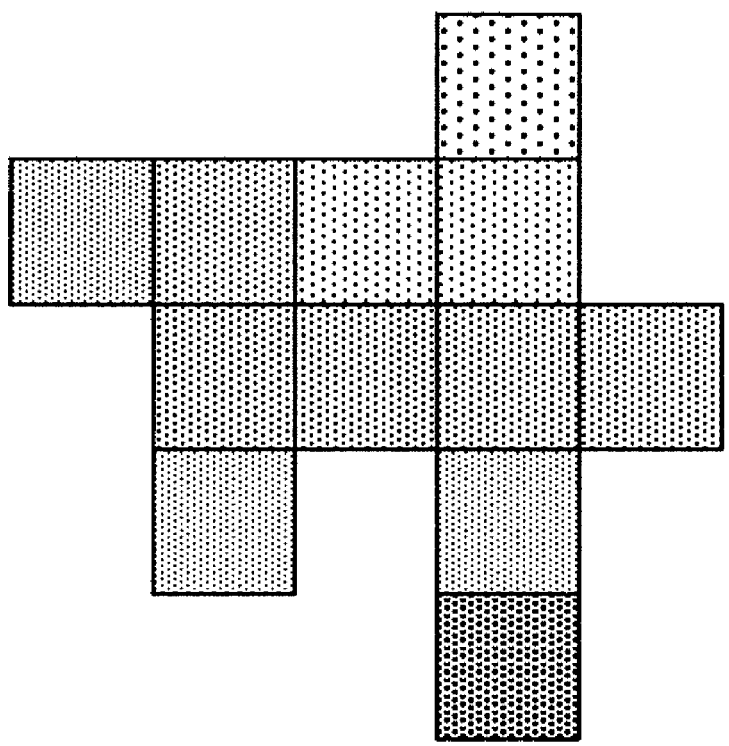
FIGS. 10A and 10B are illustrations of segmented representations of OPC data according to two embodiments of the invention.
Figure 10A:
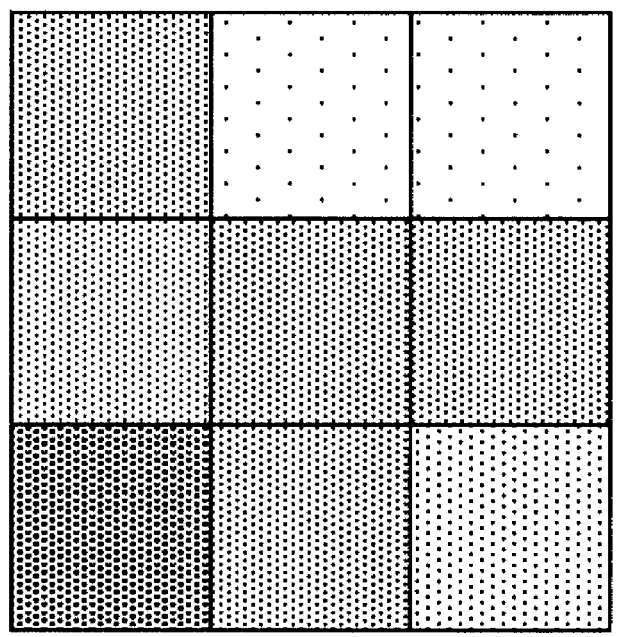

Referring to FIG. 10A, nine segments are placed in a three-by-three grid, representing a set of components that make up a larger machine, process or monitored environment. Color, shading and/or periodic changes (flashing, etc.) can provide visual information to the user indicating the state of the individual components and the overall status of the machine. For example, dark green squares may indicate that the corresponding components are working as expected, light green may indicate that the component is working slightly over the average, yellow may suggest a warning status and red may indicate a problem requiring immediate attention. The points at which the indicators change colors may be defined by one or more thresholds and/or alarm conditions representing points at which the processing parameters require greater attention.

Alternative configurations of the icon segments may be designed to impart additional visual cues to the user. Referring to FIG. 10B for example, the icon may be designed in the shape of the building (or floor plan) being monitored. In such an example, colors may be used, for example, to provide a visual overview of the temperature in the different areas of the building.

In summary, the visual representations of data can be designed by the user to reflect spatial, organizational or other characteristics of what is being monitored and that can depend upon the relevant domain. Using such an approach provides a large set of information at once while being easily understood and contextualized by the user.

Figure 11:
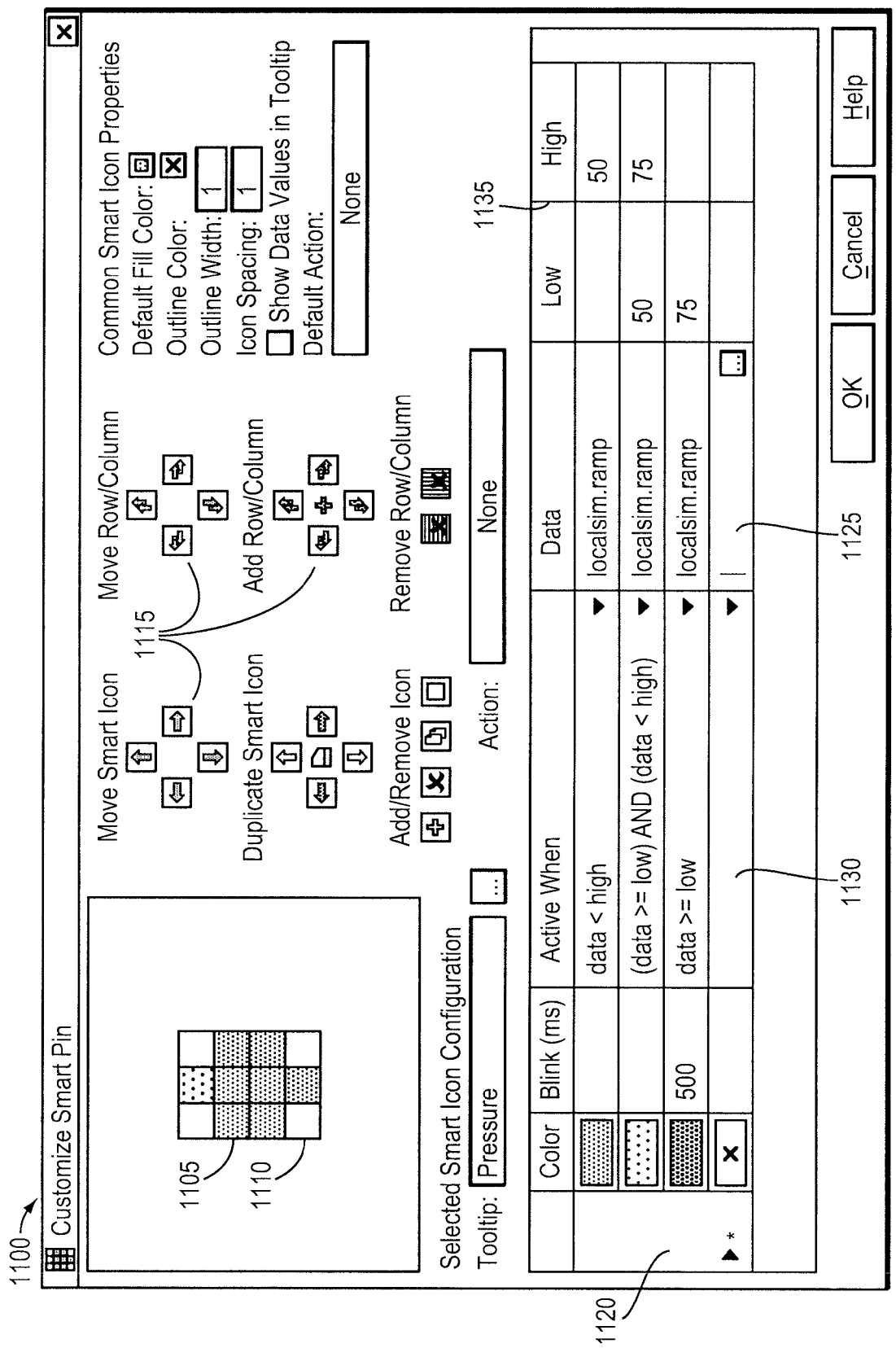
FIG. 11 is an exemplary screen capture of an application screen facilitating the design and parameters of a segmented visual representation of OPC data in accordance with one embodiment of the invention.

Design of such smart pins may be accomplished as illustrated in FIG. 11. the smart pin screen 1100 allows the user to customize various properties of the smart pin to represent facilities and processes. For example, the border color may represent some other information such as the quality of the signal or latency of the data source. A character (e.g., an exclamation point, question mark, etc.) inside the square may indicate status, e.g., that a value has changed recently changed, or that a potential problem has gone unaddressed for a period of time. As described above, a smart pin 1105 can include multiple icon segments 1110, each representing a different monitored feature. Controls 1115 may be used to add, remove or move individual icon segments 1110 such that the resulting smart pin 1105 accurately represents the overall facility or process being monitored. Data grid 1120 facilitates the definition of the icon parameters, including the color, data source mapping 1125, rules 1130 for determining when the icon is active, and threshold values 1135 that determine when the icon properties change (e.g., when the color changes in response to data received from the data source 1125).

Figure 12:
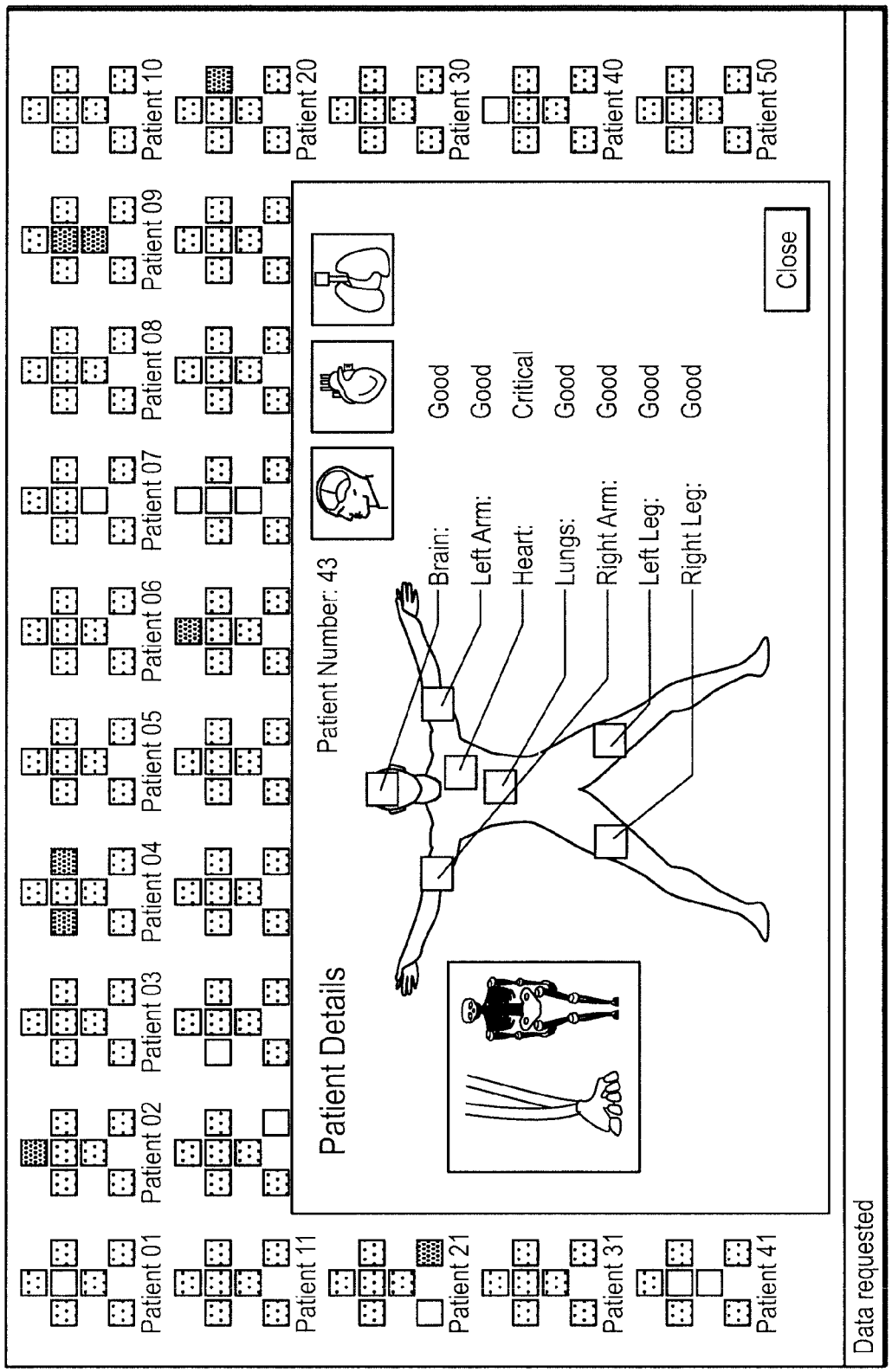
FIG. 12 is an illustration of the application of a segmented visual representation of OPC data for use in a healthcare setting in accordance with one embodiment of the invention.
Figure 13:
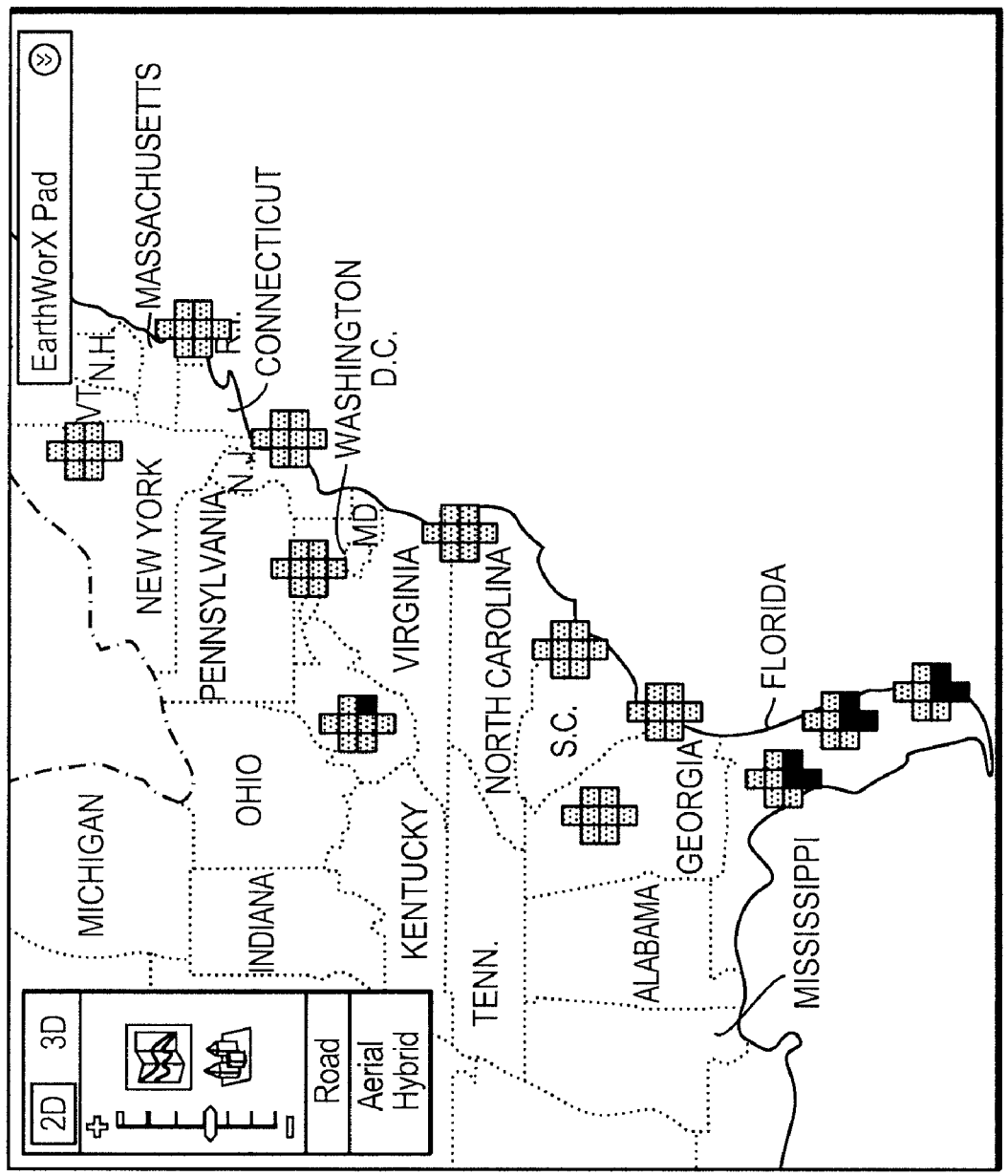
FIG. 13 is an illustration of the application of a segmented visual representation of OPC data in accordance with one embodiment of the invention.

FIGS. 12 and 13 illustrates additional examples of smart pins in the context of HMI/SCADA systems. FIG. 12 illustrates how smart pins driven by OPC data sources may be used to monitor various medical-related data sources (e.g., heart rate, oxygen consumption, blood pressure, temperature) of patients in a hospital. The arrangement of the individual icons and design of the smart pin itself to resemble a human body provides additional contextual information to the user, thus allowing for faster response times, reduced training, and an overall increase in efficiency. Furthermore, the collection of smart pins allows users to monitor many patients simultaneously using visual cues and indicators, which is very difficult if done using text and/or numerical values. Similarly, FIG. 13 illustrates the use of smart pins displayed in a geographical context representing a power-plant grid along the east coast of the United States.

Smart Symbols

Smart symbols may also provide a hierarchical grouping of primitive objects and associated properties. Such symbols may take the form of graphical representations of a control or display that resemble or evoke the physical controls (e.g., a thermometer, a dial, a gauge, or a counter) used to monitor a process. Furthermore, smart symbols can include the definition of properties allowing the internals of the symbol to be configured without "drilling into" the symbol. As a result, changing the value of a property of a smart symbol (a "smart property") automatically changes the value(s) of the associated property or properties of descendant objects based on the smart symbol. For example, consider a symbol that represents a circular gauge having a data source that determines rotational animation of a polyline—i.e., the needle of the gauge. The data source can be exposed as a property of the smart symbol, allowing the user to modify the data source (e.g., update it if the source name has changed, or change it to a new source if necessary) without having to know the details of how the internals of the symbol are structured. This simplification makes configuration of complex graphical objects significantly easier for the user.

Figure 14:
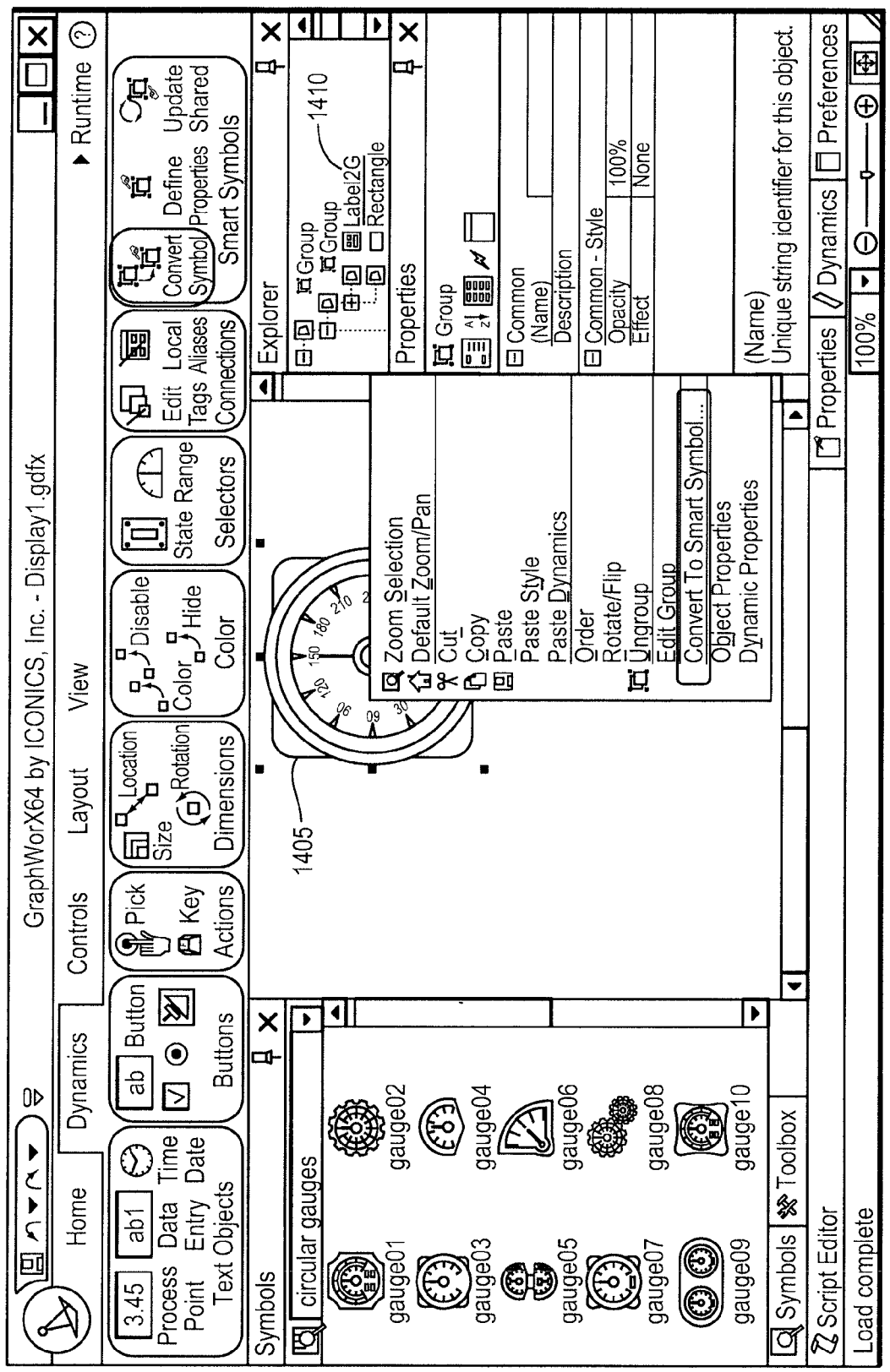
FIG. 14 is a screen capture of an application screen facilitating the definition and design of a contextual representation of OPC data in accordance with one embodiment of the invention.

Referring to FIG. 14, a smart symbol 1405 may be created using a "point-and-click wizard," without the need for using scripting or code. Initially, the smart symbol 1405 is created by converting a group of descendant objects into a smart symbol group. If needed, a smart symbol may be deleted by ungrouping the underlying objects. Once a group of objects have been converted to a smart symbol, smart properties may be added and existing properties may be edited. Smart symbol properties are used to set one or more properties of child/descendant objects contained in or otherwise based upon the smart symbol. A child object is not limited to "visual" objects; a child object may also be a non-visual object such as an animation definition or dynamic, as described below.

Smart properties may, in some embodiments, include attributes such as a property name, data type, default value, current value, description, category, type converter (primarily used to convert the property value to/from a string), and user interface editor. A property grid 1410 lists the smart properties available for editing. When a particular smart property is selected from the grid 1410, the type converter and editor user interface for that property are determined automatically based on the data type associated with the smart property. In some cases, these may be overridden, or set programmatically using scripting.

Adding or removing a smart property of a smart symbol may include the following steps. First, a property of a child/descendant object/dynamic of the smart symbol is selected from the property grid 1410. If the property is a descendant of a smart symbol and the property has not already been added as a smart property, the user may add the smart property to the symbol, or, if already associated with the symbol, it may be removed.

When adding the property, an "Add Smart Property . . . " menu item is provided, that, when selected, presents a dialog having an editable ComboBox for specifying the name of the smart property. The drop-down listing associated with the ComboBox includes existing smart properties of the parent smart symbol that are compatible with the selected child property. If the entered property name does not already exist for the smart symbol, a new smart property is added and assigned initial values using the current values of the child property used to create the smart property. If an existing smart property name is selected, the child property is added/linked to the existing smart property and the child property is assigned the value of the existing smart property. Once a child property has been added as a smart property, that child property is shown in the property grid 1410 as a special icon indicating that the property is linked to a particular smart property.

Figure 15:
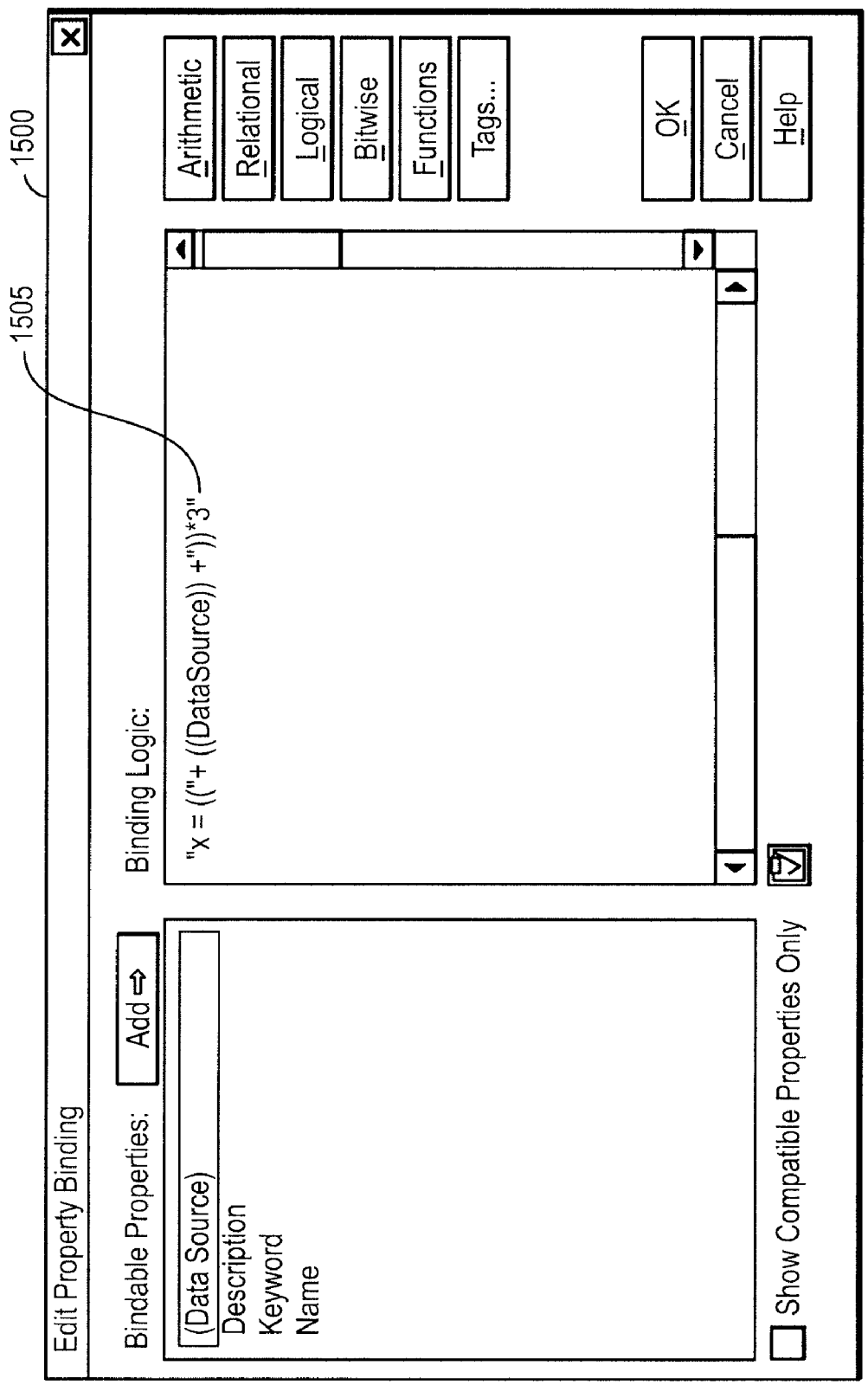
FIG. 15 is a screen capture of an application screen facilitating the definition and design of processing rules based on OPC data in accordance with one embodiment of the invention.

Advanced properties may also be provided via a property binding editor. FIG. 15 is a screen capture of an editor 1500 that allows creation of more complex property bindings that involve multiple smart property values combined using a calculated expression 1505, which may include Boolean and arithmetic expressions.

One property of the smart symbol is a "data source" of an object or animation. The data source specifies the real-time data values that drives the animations—often the data source is an OPC DA tag or OPC UA identifier that is used to get real-time data values from an OPC server. Because the data source is a commonly used property type, embodiments of the invention provide an automated mechanism for exposing all unique data sources used inside a group of objects as properties of a smart symbol, thus significantly reducing the amount of time needed to construct new smart symbols.

The simplest form of automated binding exposes all unique data sources used inside the symbol, where each unique data source is bound to a new smart property. The option to perform automatic smart binding of data sources is provided when converting a group or properties to a smart symbol. In such cases, all descendant objects of the group are examined for existing data source connections. When a data source is found, if there is not already a smart property for that data source, a new smart property is added to the smart symbol and bound to that data source property. If a smart property already exists for the data source, the data source property is bound to the existing smart property.

Figure 16:
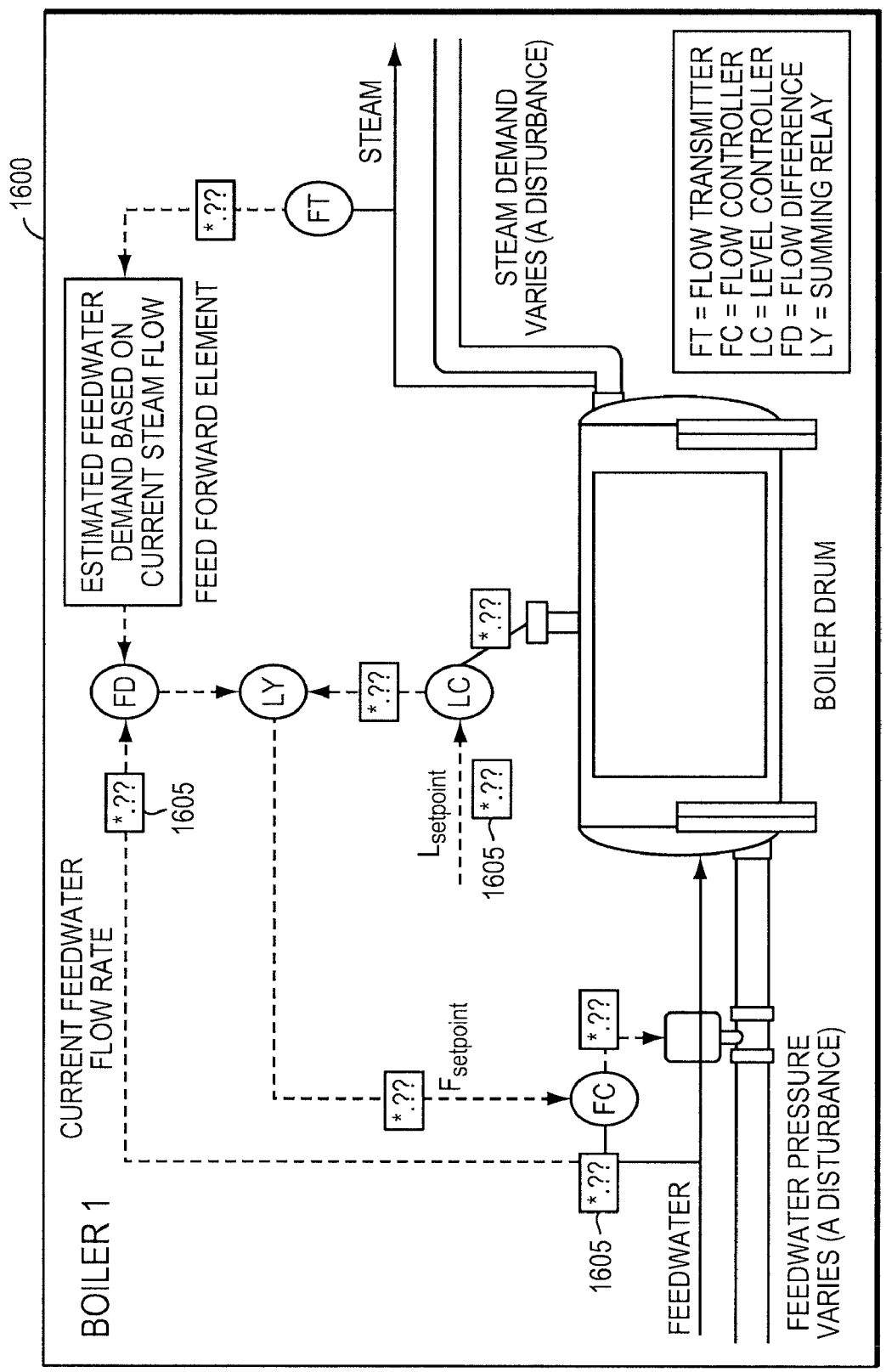
FIG. 16 is a visual representation of a boiler system annotated with OPC data in accordance with one embodiment of the invention.
Figure 17:
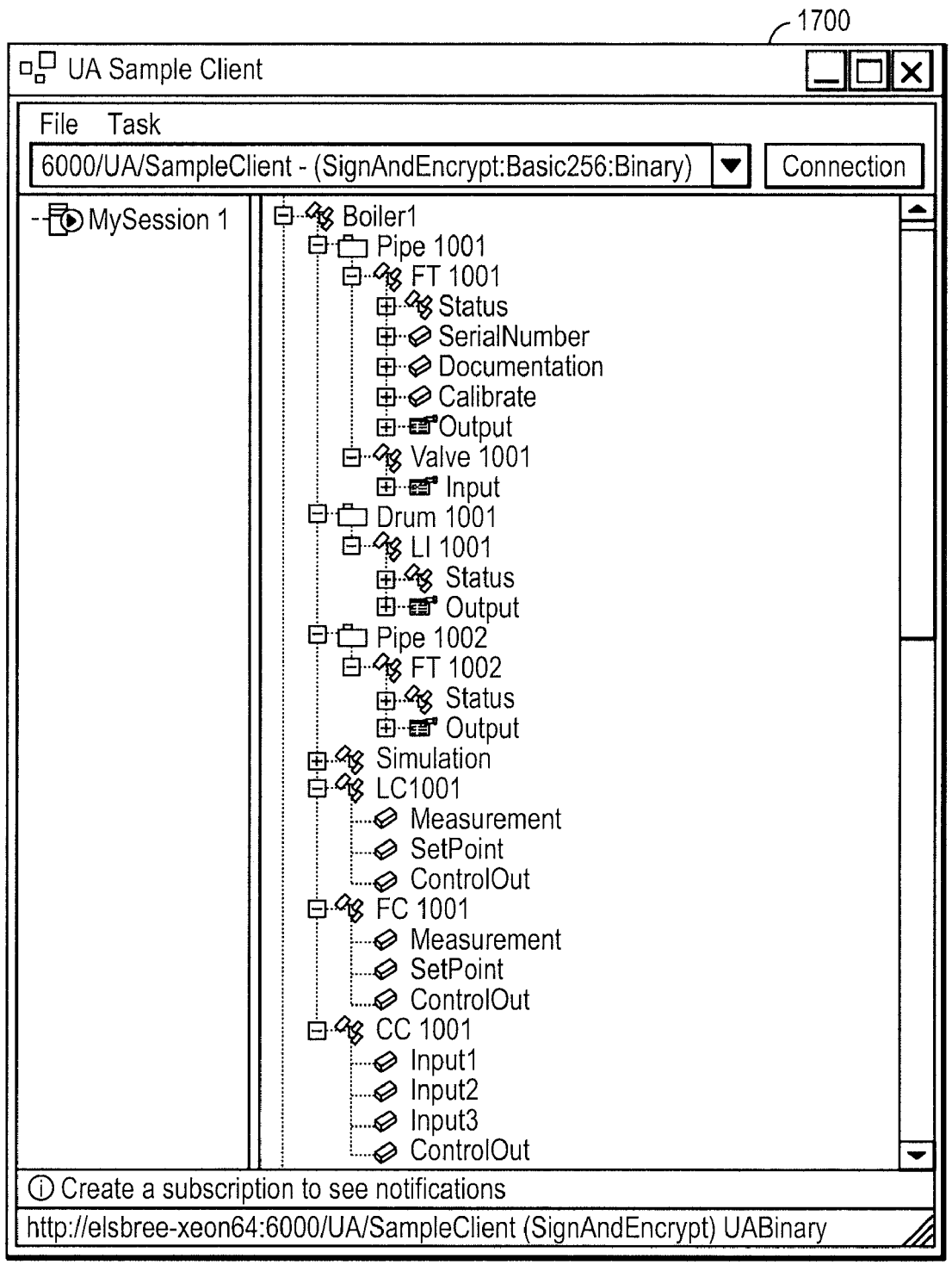
FIG. 17 is a screen capture of a structural representation of various parameters used to define the visual representation of a boiler system of FIG. 10.

In some instances, a more complex data binding association is needed. In these cases, a symbol is bound to a single complex data object via a single smart property and numerous contained animations are automatically associated with different attributes of the complex data object. This is particularly relevant to OPC UA in which complex objects and data types may be provided via a single OPC UA server or data source. For example, FIG. 16 illustrates a structure of a "boiler" object 1600 exposed from an OPC UA Server having multiple attributes 1605, each providing information about the different functions or conditions within the boiler object 1600. Again, viewing the graphical representations of data in the context of the object from which they are collected provides users with a visually relevant depiction of the current state of the facility or machinery being monitored. FIG. 17 illustrates the boiler object as a property listing 1700, showing each element of the object and facilitating the definition and modification of its properties.

As an example, an object titled "Boiler1" defined on "localhost" may be bound to the data types using the data source strings below:

```
http://localhost:5000/UA/SampleServer\Boiler1/[http://opcfoundation.
  org/UA/Sample/]FCX001.SetPoint
http://localhost:5000/UA/SampleServer\Boiler1/[http://opcfoundation.
  org/UA/Sample/]FCX001.ControlOut
http://localhost:5000/UA/SampleServer\Boiler1/[http://opcfoundation.
  org/UA/Sample/]LCX001.SetPoint
http://localhost:5000/UA/SampleServer\Boiler1/[http://opcfoundation.
  org/UA/Sample/]LCX001.Measurement
http://localhost:5000/UA/SampleServer\Boiler1/[http://opcfoundation.
  org/UA/Sample/]LCX001.ControlOut
http://localhost:5000/UA/SampleServer\Boiler1/[http://opcfoundation.
  org/UA/Sample/]PipeX001/FTX001.Output
http://localhost:5000/UA/SampleServer\Boiler1/[http://opcfoundation.
  org/UA/Sample/]PipeX002/FTX002.0utput
http://localhost:5000/UA/SampleServer\Boiler1/[http://opcfoundation.
  org/U A/Sample/]DrumX001/LIX001.Output
```

Analysis of these data sources indicates that there is a hierarchical structure to the segments of the tag and a common root of http://localhost:5000/UA/SampleServer\Boiler1. In this case, a single smart property can be created for the common root (Boiler), and the descendant properties can be bound to that smart property as a combination of the smart property value and the remaining unique segments of the tag.

After binding data sources to Smart Properties, creating a new symbol merely requires changing the "instance" of the boiler symbol from Boiler1 to Boiler2 and changing the value of the data source Smart Property from http://localhost:5000/UA/SampleServer\Boiler1 to http://localhost:5000/UA/SampleServer\Boiler2. The option to perform automatic complex data binding is provided when converting a group to a smart symbol. If selected, all objects within the group are examined for existing data source connections. Identified data sources may be analyzed to determine if they contain common hierarchical roots. If so, a new smart property may be added for each unique hierarchical root, and the descendant data source properties are automatically bound to that smart property by combining the smart property value (the common hierarchical root) with the remaining unique portion of the data source (as described above).

In addition to smart symbols, linked/referenced symbols allow for the use of one master symbol (type) that can be instantiated multiple times (instances). An instance of a referenced symbol refers to the master symbol using the following URI format: <URI-reference>= [<absoluteURI>|<relativeURI>] ["#"<elementID>] The advantage of referenced symbols is that modifications can be made to the master symbol, and those modifications are automatically propagated to the instances that reference the master.

The contents of linked symbols can be defined by referring to a master symbol via a uniform resource indicator (URI) reference. The URI reference of a linked symbol can point to a master symbol in the same file, or in some cases, in an external file (either another display file or a symbol library file). A linked symbol can be created when a group/symbol is copy/pasted, or drag-dropped from another display or the symbol library. For a referenced symbol that references a smart symbol as the master, smart property values are stored on each instance of the referenced symbol. These smart property values are propagated to the locally loaded contents of symbol instance. Loaded master symbols may be cached for performance reasons (so other linked symbols that refer to the same master symbol do not need to reload the master data).

In addition to pins placed within a GIS-enabled application, operational data may also be represented using independent "applets" or "gadgets" that provide information about a process or environment. The gadgets can be associated with web services and other sources of business data, weather information, news updates, traffic maps, Internet radio streams, and slide shows of online photo albums. For example, a gadget may provide an at-a-glance view of online instant messaging contacts, display a calendar, or control a media player. Gadgets can also have any number of dedicated purposes, such as calculators, games, sticky notes, etc.

Developing gadgets for within the Windows Vista operating system has traditionally been a complex operation requiring skills such as web development to graphic design. Various embodiments of the invention provide an easy-to-use point-and-click interface for building gadgets using a wizard-like visual editor in which users with little or no programming skills can quickly design and deploy a gadgets by taking advantage of a WCF OPC-enabled communication channel to read and write data (over a local area network or remotely over the Internet). As a result, gadgets are capable of connecting to a wide variety of data sources including, but not limited to OPC data, OPC unified architecture data, commercially-available databases, web services and SNMP. Once built, gadgets may be published to local and/or remote servers, hand-held devices, and other platforms using a publishing wizard.

In some embodiments, the browser-based client application and/or desktop may be operated remotely, and in such cases information and files are exchanged between a server and one or more clients. In a typical "thin client" scenario, users modify gadgets on a remote client without affecting the server or the other users that are connected to the server. In such cases, the changes are not implemented until the gadget is republished. Very often, however, files changed at the thin client application are part of a much larger application, and changes made to a graphical object may be linked to other graphical objects. As a result, changes made by one user may result in breaking connections with other external files or data sources.

For example, a user may attempt to publish to a server a graphical object that contains a reference to an external image, thus requiring the referenced image to be published as well. Relative paths must also be adjusted to accommodate the difference between the file structure on the client and that of the server.

The publishing wizard guides users through the process of publishing a graphical object by asking a series of questions (e.g., the address of the destination server) and presenting the user with a series of options (e.g., the protocol to use for transferring files to the server) from which he can then choose. The publishing wizard analyzes the object being published and identifies relationships to external files and data sources. Once a complete (or nearly complete) map of data relationships is built, the object can be republished and all files are transferred to the server.

In one implementation, the system includes a web page and an application programming interface ("API"). The web page contains scripting code (e.g., Javascript) that interacts with the Microsoft Virtual Earth software development kit ("SDK"). The API may be written in any programming language (e.g., C#, C++, java, etc.). The API calls script embedded within the webpage when the webpage is rendered or actions are detected on the web page. The user interface ("GUI") includes two components, a toolbar and a browser component. The browser component includes the HTML page (not shown), and the toolbar includes the interface components that interact with the map.

In another implementation the system renders Virtual Earth maps downloading images representing portions of a map (called "tiles") directly from a server (e.g., the Microsoft Virtual Earth server). The system includes a mechanism to download the tiles, a graphical user interface ("GUI"), and an API. Downloaded tiles are cached and deleted by a "garbage collector" function when no longer needed. Tiles are used by the rendering engine to create and update the map that is displayed depending on the map configuration. The API allows client applications to interact with the map, its configuration, and its layout.

Figure 18:
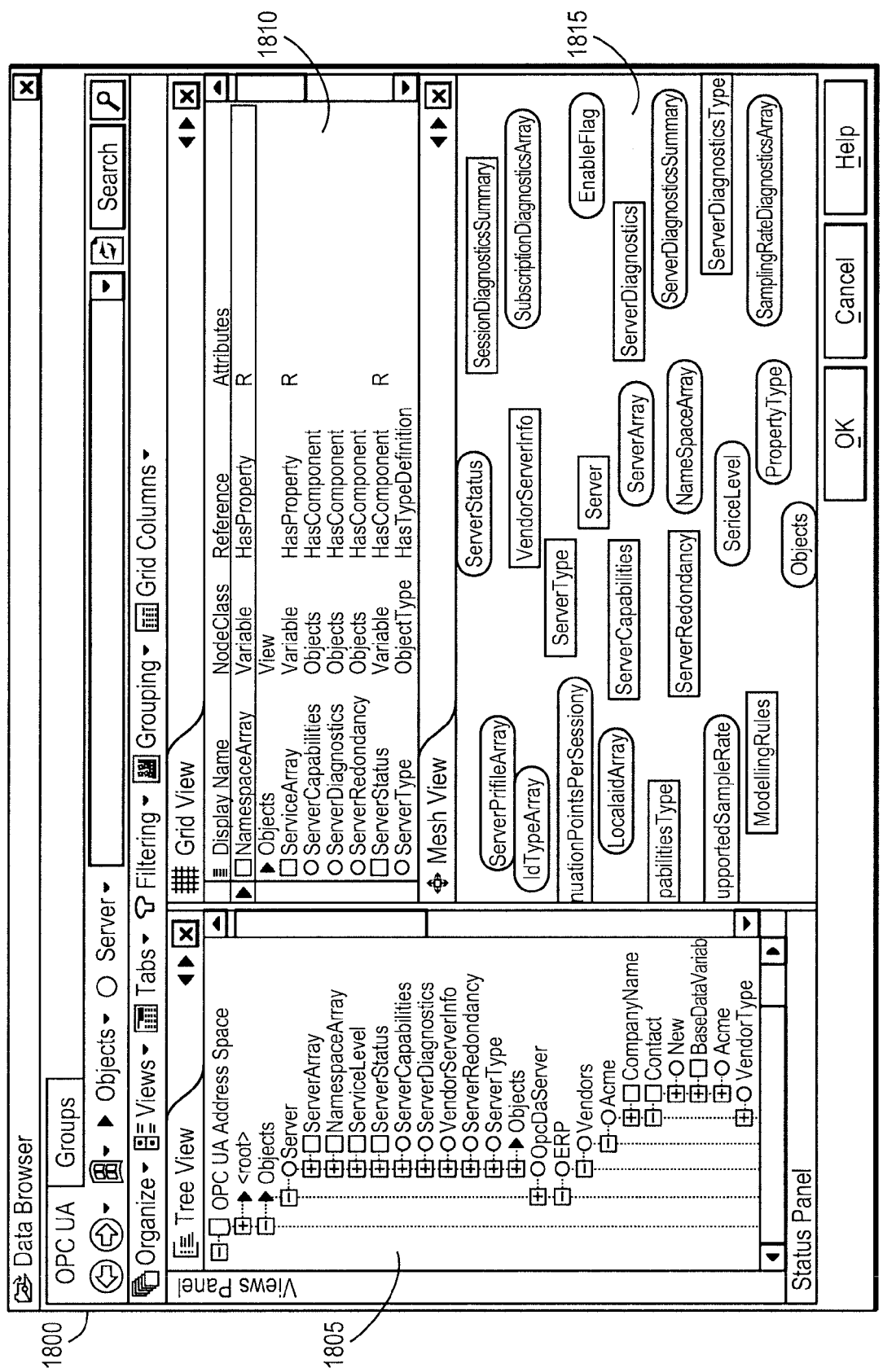
FIG. 18 is a screen capture of a data browser application illustrating various representations of OPC data sources according to one embodiment of the invention.

In other embodiments, the invention expands on the "ribbon" concept included in Microsoft Office to provide a task-centric user interface in which common tasks are organized into ribbon bars that contain common tools used to accomplish the tasks. In one embodiment, ribbons may be "activated" in response to the current context in which the user is operating and the tasks being performed. For example, as a user creates a three-dimensional element, the entire ribbon (or some subset thereof) changes to present tasks related to creating the three-dimensional element. If the user then changes tasks and starts creating an alarm or trend indicator, a different ribbon having a different set of controls is presented. In addition to using the ribbon construct, an object gallery is used to facilitate rapid styling and point-and-click configuration of applications and application components. FIGS. 16, 17 and 18 illustrate various screens that may be used to apply visual styles such as pen styles, shaping, shadows, glow effects, blur and bevel to visual objects such as charts.

In addition to viewing operation process data, the data itself may be viewed in such a manner as to provide contextual reference to individual data elements. Using the techniques described below, for example, users can see how data elements, data sources, and data transmission avenues relate to one another, and how they support the graphical representations of the processes and environments from which the data is collected. This provides universal connectivity to numerous client applications, thus allowing users to explore and connect to multiple data sources of different types. The data sources accessible through the browser include, but are not limited to OPC data, OPC UA, SNMP data, and data extracted from other databases that store operational data.

FIG. 17 is a screen capture of a data browser 1800 that provides three ways to browse the data sources, including flat-list grid visualization (1805), hierarchical tree visualization (1810) and full mesh visualization (1815). The browser employs a unique mesh visualization engine to present data points having a complex mesh structure with multiple inter-relationships. In some instances, different data types may be represented using different shapes, and data relationships can represented using links with different colors and patterns, indicating status, direction, or other characteristics.

The layout of the data mesh view may be customized through a series of tabs that allow hiding, showing and stacking different elements of the user interface. The browser also uses the concept of a "breadcrumb bar" that maintains traces of the path followed by the user for exploring the data, and allows forward and backward navigation through the user's historical path. As an example, a "breadcrumb bar" may be provided as a menu option, which when selected presents the user with her historical data path. Clicking on an element of the data path presents a drop-down menu with possible alternative paths that can be taken from that particular point in the data mesh.

Another feature within the browser is data filtering, which filters the data being presented within the browser based on characteristics of an individual data point, or based on the relationship between multiple data points. In instances in which the data is hierarchically organized, filters may be applied based on the hierarchical structure such that filtering out a parent data node explicitly removes children nodes. The data grouping feature allows users to group elements together with simple drag-and-drop operations within the browser.

Three-Dimensional Viewing of OPC Data

In some embodiments, the invention provides a three-dimensional illustration engine for facilitating real-time visualization of operational and monitoring data, as well as the charting and trending of the data. By adding depth to the objects used to visually represent processes and/or environments, the invention provides a compelling and accurate user interface. Features of the engine include visualization of real-time data, animation, dynamic interaction, modeling, texturing, illumination and event scripting. Using these tools, a user can create dynamic animations of a monitored facility and/or process and associate the animations with data provided by the data layer. The dynamic animations can be associated to three-dimensional objects, a group of objects, or the workspace itself. Each object is defined using a series of dynamics that define how an object is presented and manipulated.

A location dynamic animates the position of an object by constraining it to a predefined three-dimensional polyline in the workspace. The position along the polyline is determined from the value of the data source associated with the dynamic, representing the "shift" along the polyline from a known origin. In one implementation, the minimum possible value of the data source is mapped to the starting point of the polyline and the maximum value of the data source is mapped to the end point of the polyline. A constrained location dynamic allows the object to be moved while maintaining constant rotation angles as well as automatically rotating the object such that it aligns with the tangent of a current line segment. A free-location dynamic binds the X, Y and Z coordinates of an object to data sources such that data-source values are interpreted as coordinates on the respective axes. In some cases, the same data source may be associated with multiple coordinates, and/or one or more coordinates may remain unbound. The location dynamic can use a local or an absolute coordinate space. Similarly, a rotation dynamic associates a rotation angle with values from a bound a data source. Like the free location dynamic, the same data source may be bound to multiple rotation angles, and a rotation angle may remain unbound.

A size dynamic allows scaling objects along one, two or three axes. The scale is proportional to the values of a data source associated with each of the axes. Minimum and maximum values may be defined and associated with a range of data source values. In some cases, a single data source (or set of data sources) may be reused to scale different axes simultaneously. An axis may remain unbound, or based on a local or absolute coordinate space. A hide dynamic allows hiding or disabling of an object as a function of the value of the associated data source. A color dynamic allows modifying the color and texture of an object in function of the value of the associated data source.

In various embodiments of the invention, these dynamics facilitate the presentation of two-dimensional information in a three-dimensional space using "3D Plus Objects." 3D Plus Objects are a variation of 2D objects that reside in a 3D space and are linked to 3D geometry. Examples of 3D Plus Objects include annotations and process points, and are comprised of two parts—an anchor point that binds the link to a surrounding object or objects, and a display area that presents a value or a string that always faces the user no matter which rotation angle or camera perspective is currently in use. As such, 3D Plus Objects act as "billboard objects" that can maintain a consistent projection and/or orientation to the user, regardless of the orientation of the three-dimensional object to which they are linked. In some cases, 3D Plus Objects can "float" within the 3D space and automatically rearrange themselves to guarantee minimal overlapping in the 2D projected space. These objects are positioned by calculating their position and orientation in three dimensions, but are rendered as a two-dimensional stencil.

Figure 19:
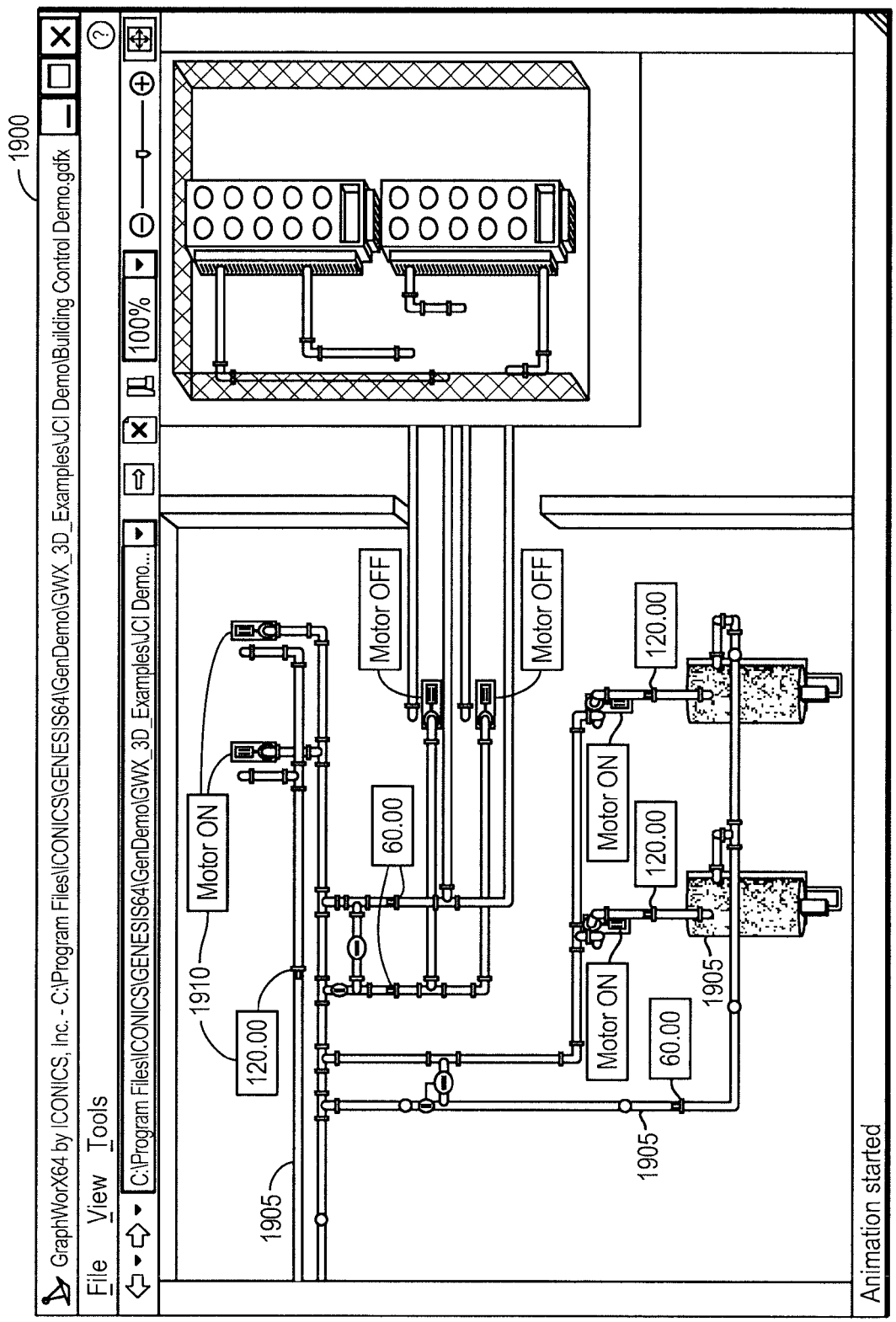
FIGS. 19 and 20 are three-dimensional representations of a processing facility annotated with OPC data in accordance with one embodiment of the invention.
Figure 20:
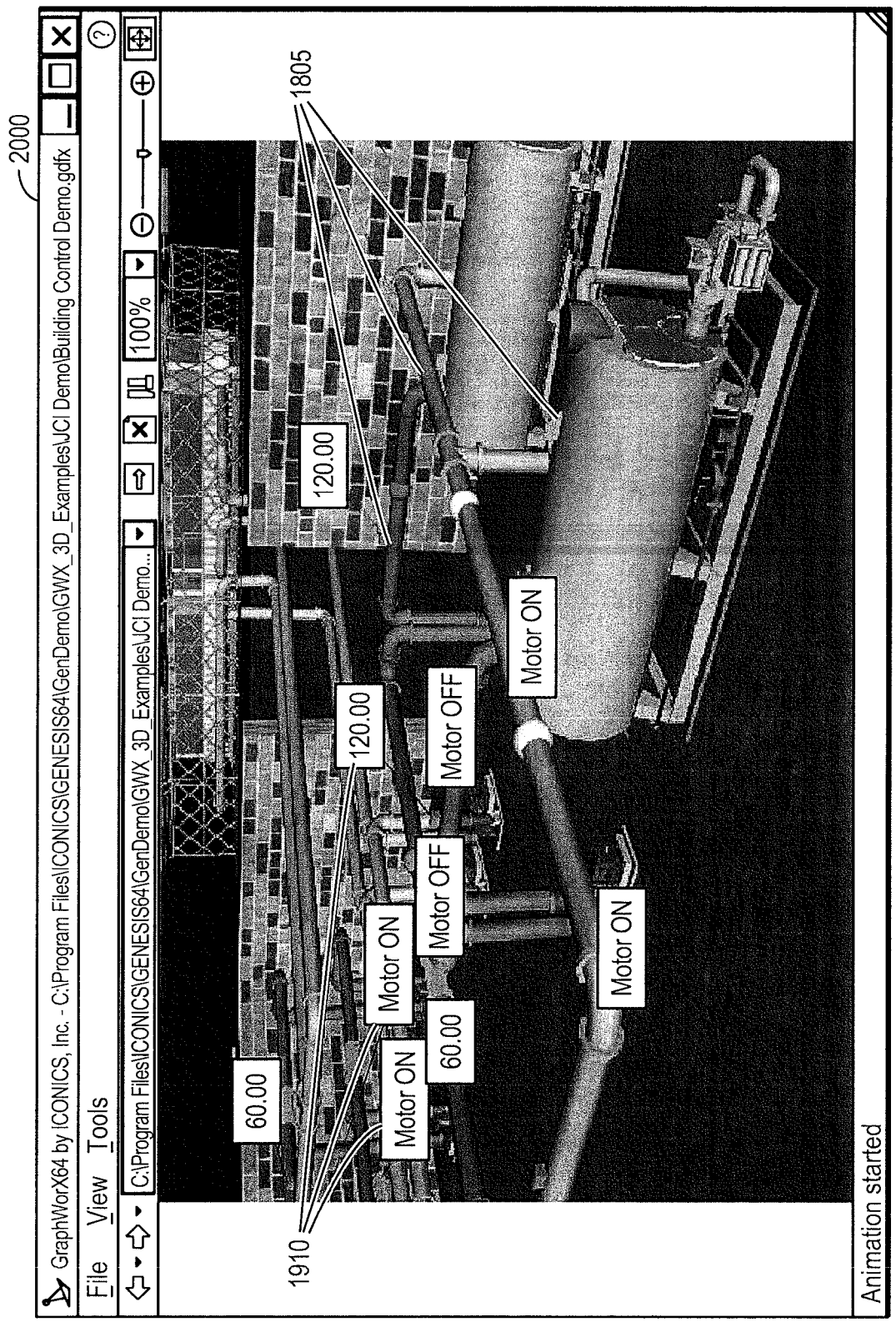

As an example, FIGS. 19 and 20 illustrate 3D representations 1900 and 2000 of a piping system, and provide accurate representations of the spatial relationships among the equipment 1905 (pipes, valves, pumps, boilers), while the 3D Plus objects 1910 (numeric temperature values, motor status) ensure that key process values are always oriented to be visible to the user, and maintain proximity to the indicated item, regardless of the orientation of the 3D scene. Representing OPC data in this manner allows users to view key process metrics completely in context and use the spatial relationships to infer or detect causes of equipment failure or sub-optimal processing.

Business Analytics and Overall Equipment Effectiveness

In addition to providing detailed presentations of OPC data, alarms, and trends at the individual process and tool level, the system and techniques described above facilitate the analysis of real-time manufacturing data from a multitude of data sources and the transformation of the data into actionable key performance indicators using Overall Equipment Effectiveness (OEE) calculations.

There is an evolving demand for off-the-shelf products targeting production data analysis for the purpose of improving manufacturing productivity and profitability. Key metrics such as OEE and Effective Downtime are especially strong areas of interest. By monitoring and capturing OPC data in the manner described above, embodiments of the invention can transform process control information from various sources, not necessarily related to each other or using the same measurements, into meaningful performance and quality OEE indicators to aid analysis and support decision making within a manufacturing process.

Figure 21:
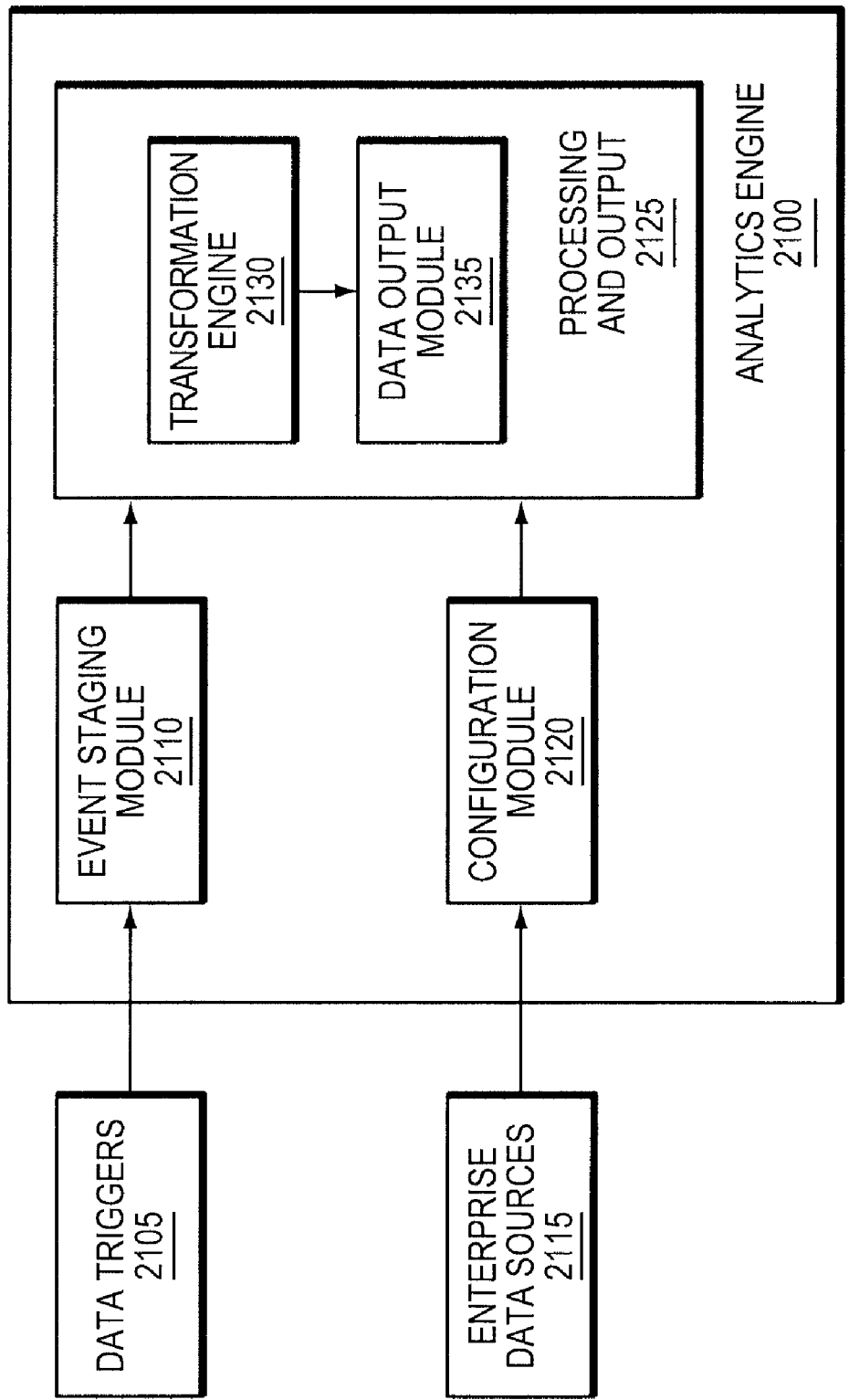
FIG. 21 is a block diagram of an data analytics and reporting engine for capturing and processing OPC data in accordance with one embodiment of the invention.

For example, downtime analysis is essential to properly evaluate and understand the events that influence halted or interrupted production of a manufacturing facility. Existing Statistical Downtime Analysis (SDA) tools, used to evaluate the causes of downtime so that production efficiency can be maximized, tend to have limited capabilities with respect to effectively aggregating and processing various pieces of information in real time. Referring to FIG. 21, a centralized analytics engine 2100 collects and analyzes distributed process information from various sources and, in real-time, aggregates and/or transforms the data into formats that facilitate OEE reporting.

In various embodiments, the analytics engine 2100 receives OPC data from various data triggers 2105. Examples of data triggers 2105 operating in one or more facilities include a trigger logger for tracking events such as counters, cycle times, and downtime statistics from external and/or legacy systems, an alarm server/logger for tracking process and downtime events, as well as implementation-specific, custom data sources. In addition to process/facility data, additional enterprise data sources 2115 provide other data such as asset definitions (e.g., specifications regarding equipment and/or facilities), general configuration parameters, roles and responsibilities, workflow information, as well as production and scheduling definitions. OPC data is collected by an event-staging module 2110 whereas the enterprise data is collected at a configuration module 2120. As the data is collected, a processing and output engine 2125 receives data form both the event-staging module 2110 and the configuration module 2120 transformation to facilitate real-time reporting. Initially, a transformation engine 2130 processes the OPC and configuration related information using a centralized data fusion approach such that all process information, regardless of the originating source, can be summarized in an output module 2135. The data may then be visualized as a self contained entity and made accessible from a variety of clients. The analytics engine 2100 offers a centralized environment for distributed process information collection from various sources and intelligent transformation of the collected information into valuable OEE performance indicators.

In some implementations, managed Common Language Runtime (CLR) NET objects are created within a database (e.g., Microsoft SQL Server 2005) to extend the database functionality and allow for real-time analysis of manufacturing and process control data using Microsoft's virtual machine component. Conventional transaction-based SQL databases do not provide the necessary extensibility for advanced manufacturing intelligence and data processing.

For example, the data collection components of the analytics engine 2100 collect the various pieces of process information and store the data in a database. To be meaningful in the OPC context, however, this data needs to be analyzed in real-time and the data's information payload needs to be processed, extracted and redirected to the appropriate logical processing units. To that end, compiled NET code assemblies are created and stored inside Microsoft SQL Server 2005 using Microsoft SQL Server 2005 native CLR integration support. These assemblies perform the tasks of data extraction, data transformation, data redirection, data summarization and data retrieval in real time as the process control data information is made available. This new and unique approach for process control data analysis, which abstracts from the end user the complicated task of process control data collection, extraction, transformation and load (ETL) provides an aggregated view of process performance.

To assist users in creating and managing the mappings of OPC data sources and devices to the various corporate business information systems, certain embodiments of the invention include a graphical workflow tool to define individual transactions and events that occur within the system based on OPC data collected from the various sources using Microsoft SQL Server, SAP, Microsoft Access, ODBC, OLEDB, Web services, Oracle, or virtually any other data source.

Figure 22:
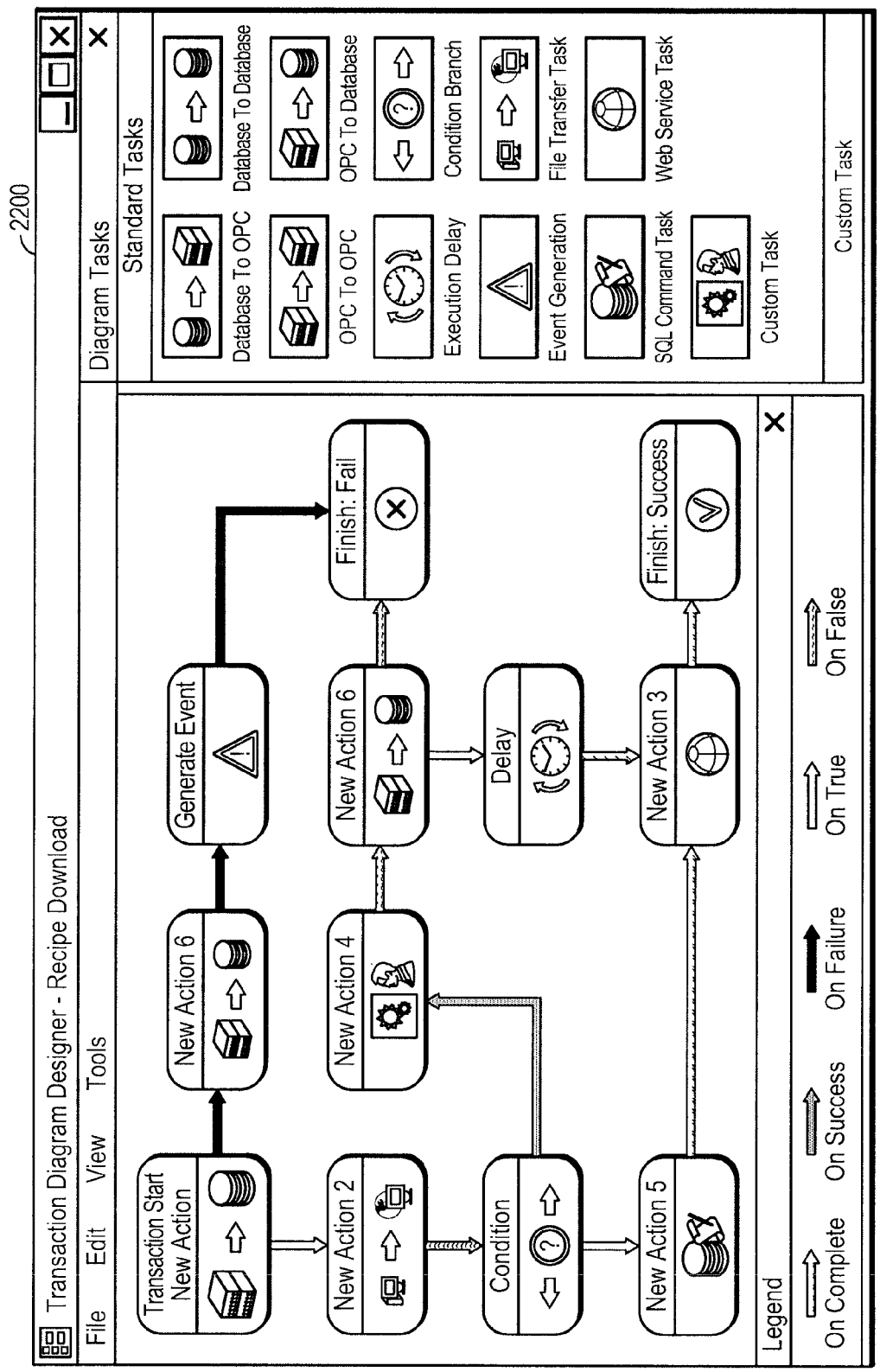
FIG. 22 is a screen capture of a process and data modeling application for modeling business rules and data flow logic relating to OPC data in accordance with one embodiment of the invention.

One fundamental problem with conventional approaches to collecting and viewing process control data is the lack of centralized management of distributed data sources and the inability to bridge and aggregate information and activities across departments, manufacturing units, and business entities into a common view. To address this shortcoming, the embodiments of the invention provide a graphical workflow tool that facilitates the visual definition of the logical flow of data, error handling conditions, custom logic and precedence constraints. FIG. 22 illustrates an exemplary graphical user interface 2200 that allows users to easily connect defined actions or objects to any data exchange or redirection of process control data. Such functionality enables the accurate modeling of any complex data-bridging operation and program using business rules and data-flow logic that otherwise would be extremely difficult to implement without dedicated hardware.

To further facilitate analysis of real time OPC data, processing information may be related to a group of associated process values and information and defined as an "intelligent process event." As such, the information payload of a typical event is extended to a global view of the process state as it includes data describing various processing and state conditions of the process generating the event. In this way, an ordinary process event becomes an intelligent event providing rich information that can influence several process control variables. These related values attributed to each intelligent process event can represent information such as a shift, an operator, a product ID or SKU # (as well as others), greatly enhancing the analytical capabilities of the entire application by allowing the user to understand the true context of the information being presented.

This unique approach transparently bridges multiple sources of process control event information in real time and minimizes the need for independent data source processing. It provides the foundation of centralized process information fusion as well as a software based process information aggregation model which is both extremely flexible and powerful.

The functionality of the modules and components described herein may be implemented in hardware or software, or a combination of both on a general-purpose computer. In addition, such an implementation may include one or more software programs that set aside portions of a computer's RAM to provide control logic that affects one or more of the receipt, transformation and/or reporting of OPC data, as well as the processes for configuring the OPC server(s). In such an embodiment, the program(s) may be written in any one of a number of high-level languages, such as FORTRAN, PASCAL, C, C++, C#, Java, Tcl, or BASIC. Further, the program(s) can be written in a script, macro, or functionality embedded in commercially available software, such as EXCEL or VISUAL BASIC. Additionally, the software may be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

While the invention has been particularly shown and described with reference to specific embodiments, it should be understood by those skilled in the area that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A system for displaying operational process control data, the system comprising:
 a human-machine interface comprising a geographic representation of an area of interest, a graphical representation of a monitored process, and one or more graphical status indicators, each being associated with a component of the monitored process, wherein the status indicators are displayed at locations within the geographic representation corresponding to physical locations at which the corresponding components of the monitored process operate, and are responsive to operational process control data generated by the monitored process,
 wherein the graphical status indicators comprise a plurality of similarly-shaped icon segments, each icon segment being uniquely associated with and responsive to a different element of operational process control data, wherein the different elements are received from different sources and displayed as parts of a single graphical status indicator; and
 a server for configuring the graphical representation of the monitored process, the graphical status indicators, and the association between the graphical status indicators and the respective components of the monitored process, wherein configuring the graphical status indicators comprises:
  creating at least one of the graphical status indicators by adding icon segments to an indicator template and arranging the added segments to resemble a physical arrangement of the component associated with the indicator, and
  defining, for each added segment, a plurality of visual states, each state alternatively activatable by the satisfaction of a configurable rule associated with the state, the rule comprising an evaluation of the operational process control data element associated with the respective segment.

2. The system of claim 1 further comprising a data storage device, operably coupled to the to server, for storing configuration parameters defining the graphical representation of the monitored process and the graphical status indicators.

3. The system of claim 1 wherein the geographical representation of the area of interest is based at least in part on data received from a geographic information system.

4. The system of claim 1 wherein the human-machine interface further comprises an interactive controller for facilitating panning and zooming of the representation of the area of interest.

5. The system of claim 1 wherein visual properties of the graphical status indicators change in response to changes in the operational process control data associated therewith.

6. The system of claim 5 wherein the visual properties change in real-time.

7. The system of claim 5 wherein at least a portion of the operational process control data is processed prior to influencing the visual properties of the graphical status indicators.

8. The system of claim 5 wherein the operational process control data is compared to one or more thresholds, and the result of the comparison influences one or more visual properties of the graphical status indicators.

9. The system of claim 1 wherein, upon receipt of a user-initiated command directed to one or more of the graphical status indicators, the human-machine interface displays the operational process control data associated with the one or more graphical status indicators.

10. The system of claim 1 wherein a subset of the plurality of segments each comprise a graphical depiction evoking a component of an operational process control device.

11. The system of claim 1 wherein (a) the geographic representations of the monitored processes comprise three-dimensional renderings of the monitored processes and (b) the graphical status indicators remain associated with each monitored process notwithstanding changes to orientations of the three-dimensional renderings.

12. The system of claim 1 wherein the server maintains a listing of operational process control data sources for association with the graphical status indicators.

13. The system of claim 12 wherein the server accesses the operational process control data sources using one or more of native database protocols, application programming interfaces, web services, streaming data feeds, or open database connectivity interfaces.

14. An article of manufacture having computer-readable program portions embodied thereon for providing a visual representation of operational process control data, the article comprising computer-readable instructions for:
generating a human-machine interface comprising a geographic representation of an area of interest, a graphical representation of a monitored process, and one or more graphical status indicators, each being associated with a component of the monitored process, wherein the status indicators are displayed at locations within the geographic representation corresponding to physical locations at which the corresponding components of the monitored process operate, and are responsive to operational process control data generated by the monitored process,
wherein the graphical status indicators comprise a plurality of similarly-shaped icon segments, each icon segment being uniquely associated with and responsive to a different element of operational process control data, wherein the different elements are received from different sources and displayed as parts of a single graphical status indicator; and
configuration of the graphical representation of the monitored process, the graphical status indicators, and the association between the graphical status indicators and the respective components of the monitored process, wherein configuration of the graphical status indicators comprises:
creating at least one of the graphical status indicators by adding icon segments to an indicator template and arranging the added segments to resemble a physical arrangement of the component associated with the indicator, and
defining, for each added segment, a plurality of visual states, each state alternatively activatable by the satisfaction of a configurable rule associated with the state, the rule comprising an evaluation of the operational process control data element associated with the respective segment.

15. The article of manufacture of claim 14 further comprising instructions for storing on a physical storage medium the configuration parameters defining the graphical representation of the monitored process and the graphical status indicators.

16. A method of monitoring a process, the method comprising:
receiving a plurality of data feeds, each data feed comprising operational process control data representative of one or more components of the monitored process; and
displaying, on a human-machine interface, a geographic representation of an area of interest, a graphical representation of the monitored process, and one or more graphical status indicators, each of the graphical status indicators being associated with a component of the monitored process, and wherein the status indicators are displayed at locations within the geographic representation corresponding to physical locations at which the corresponding components of the monitored process operate, and are responsive to the operational process control data,
wherein the graphical status indicators comprise a plurality of similarly-shaped icon segments, each icon segment being uniquely associated with and responsive to a different element of operational process control data, wherein the different elements are received from different sources and displayed as parts of a single graphical status indicator; and
configuring, on a server, the graphical representation of the monitored process, the graphical status indicators, and the association between the graphical status indicators and the respective components of the monitored process, wherein configuring the graphical status indicators comprises:
creating at least one of the graphical status indicators by adding icon segments to an indicator template and arranging the added segments to resemble a physical arrangement of the component associated with the indicator, and
defining, for each added segment, a plurality of visual states, each state alternatively activatable by the satisfaction of a configurable rule associated with the state, the rule comprising an evaluation of the operational process control data element associated with the respective segment.

17. The method of claim 16 further comprising storing the configuration parameters in a data storage module.

18. The method of claim 16 wherein visual properties of the graphical status indicators change in response to changes in the operational process control data associated therewith.

19. The method of claim 18 wherein the visual properties change in real-time.

20. The method of claim 18 further comprising processing at least a portion of the operational process control data prior to influencing the visual properties of the graphical status indicators.

21. The method of claim 18 further comprising comparing the operational process control data to one or more thresholds, whereby the result of the comparison influences one or more visual properties of the graphical status indicators.

22. The method of claim 16 further comprising:
receiving a user-initiated command directed to one or more of the graphical status indicators; and
displaying the operational process control data associated with the one or more graphical status indicators.

23. The method of claim 16 wherein (a) the geographic representations of the monitored processes comprise three-dimensional renderings of the monitored processes and (b) the graphical status indicators remain associated with each monitored process notwithstanding changes to orientations of the three-dimensional renderings.

24. A method for configuring graphical status indicators associated with operational process control data, the method comprising:

associating one or more graphical status indicators with respective sources of operational process control data representative of operations at corresponding components of a monitored process, wherein the graphical status indicators comprise a plurality of similarly-shaped icon segments, each icon segment being uniquely associated with and responsive to a different element of operational process control data, wherein the different elements are received from different sources and displayed as parts of a single graphical status indicator;

associating the graphical status indicators with geographical locations at which the components of the monitored process occur;

associating individual segments of the graphical status indicators with the corresponding components of the monitored process;

creating at least one of the graphical status indicators by adding icon segments to an indicator template and arranging the added segments to resemble a physical arrangement of the component associated with the indicator;

defining, for each added segment, a plurality of visual states, each state alternatively activatable by the satisfaction of a configurable rule associated with the state, the rule comprising an evaluation of the operational process control data element associated with the respective segment; and storing configuration parameters describing (i) the associations between the graphical status indicators and the sources of operational process control data, the geographic locations, and the corresponding components of the monitored process and (ii) the arrangement of the individual segments in a server for subsequent retrieval and use in displaying the graphical status indicators.

25. The method of claim 24 wherein the geographical locations comprise three dimensional coordinates and the display of the graphical status indicators comprises a three-dimensional renderings of the monitored process.

26. The method of claim 25 wherein the graphical status indicators remain associated with each monitored process notwithstanding changes to orientations of the three-dimensional renderings.

* * * * *